US008848081B2

(12) United States Patent
Ise

(10) Patent No.: US 8,848,081 B2
(45) Date of Patent: Sep. 30, 2014

(54) IMAGE PROCESSING APPARATUS, CONTROL METHOD, AND COMPUTER-READABLE STORAGE MEDIUM

(75) Inventor: Makoto Ise, Yokohama (JP)

(73) Assignee: Canon Kabushiki Kaisha (JP)

( * ) Notice: Subject to any disclaimer, the term of this patent is extended or adjusted under 35 U.S.C. 154(b) by 768 days.

(21) Appl. No.: 12/347,391

(22) Filed: Dec. 31, 2008

(65) Prior Publication Data

US 2009/0174788 A1 Jul. 9, 2009

(30) Foreign Application Priority Data

Jan. 7, 2008 (JP) .................. 2008-000595

(51) Int. Cl.
*H04N 3/14* (2006.01)
*H04N 5/232* (2006.01)
*H04N 5/372* (2011.01)
*H04N 5/357* (2011.01)
*H04N 5/217* (2011.01)

(52) U.S. Cl.
CPC ........... *H04N 5/372* (2013.01); *H04N 5/23245* (2013.01); *H04N 5/3577* (2013.01)
USPC ............................. 348/312; 348/241; 348/298

(58) Field of Classification Search
USPC ......................................... 348/294, 298, 312
See application file for complete search history.

(56) References Cited

U.S. PATENT DOCUMENTS

| | | | | | |
|---|---|---|---|---|---|
| 5,434,619 | A | * | 7/1995 | Yonemoto | 348/241 |
| 5,841,471 | A | * | 11/1998 | Endsley et al. | 348/231.6 |
| 6,507,365 | B1 | * | 1/2003 | Nakamura et al. | 348/296 |
| 6,947,087 | B2 | * | 9/2005 | Egawa et al. | 348/304 |
| 6,999,120 | B1 | * | 2/2006 | Egawa et al. | 348/296 |
| 7,274,398 | B2 | * | 9/2007 | Pearson | 348/312 |
| 7,626,616 | B2 | * | 12/2009 | Kokubo et al. | 348/229.1 |
| 7,697,038 | B2 | * | 4/2010 | Ohwa | 348/222.1 |
| 7,812,875 | B2 | * | 10/2010 | Takahashi et al. | 348/296 |
| 7,880,789 | B2 | * | 2/2011 | Kobayashi | 348/311 |
| 8,174,589 | B2 | * | 5/2012 | Ise | 348/241 |
| 2005/0052542 | A1 | * | 3/2005 | Iwai et al. | 348/222.1 |
| 2008/0237446 | A1 | * | 10/2008 | Oshikubo et al. | 250/208.1 |

FOREIGN PATENT DOCUMENTS

| | | |
|---|---|---|
| JP | 01-318467 A | 12/1989 |
| JP | 2000-101902 A | 4/2000 |
| JP | 2001-285726 A | 10/2001 |
| JP | 2003-298944 A | 10/2003 |
| JP | 2007-201635 A | 8/2007 |

OTHER PUBLICATIONS

Office Action issued Feb. 14, 2012 for corresponding JP 2008-000595.

* cited by examiner

*Primary Examiner* — Ngoc-Yen Vu
(74) *Attorney, Agent, or Firm* — Rossi, Kimms & McDowell LLP

(57) ABSTRACT

An image processing apparatus that enables to make a periodic noise in a captured image less noticeable without making the whole construction thereof complicated. An image pick up unit accumulates electric charges corresponding to an optical image of a target object and transfers the accumulated electric charges, and also reads them out as image signals. A control unit drives the image pick up unit to read out the image signals consecutively from the image pick up unit in a field-by-field base in such a manner so as to make the horizontal cycle of each field different from one another.

15 Claims, 19 Drawing Sheets

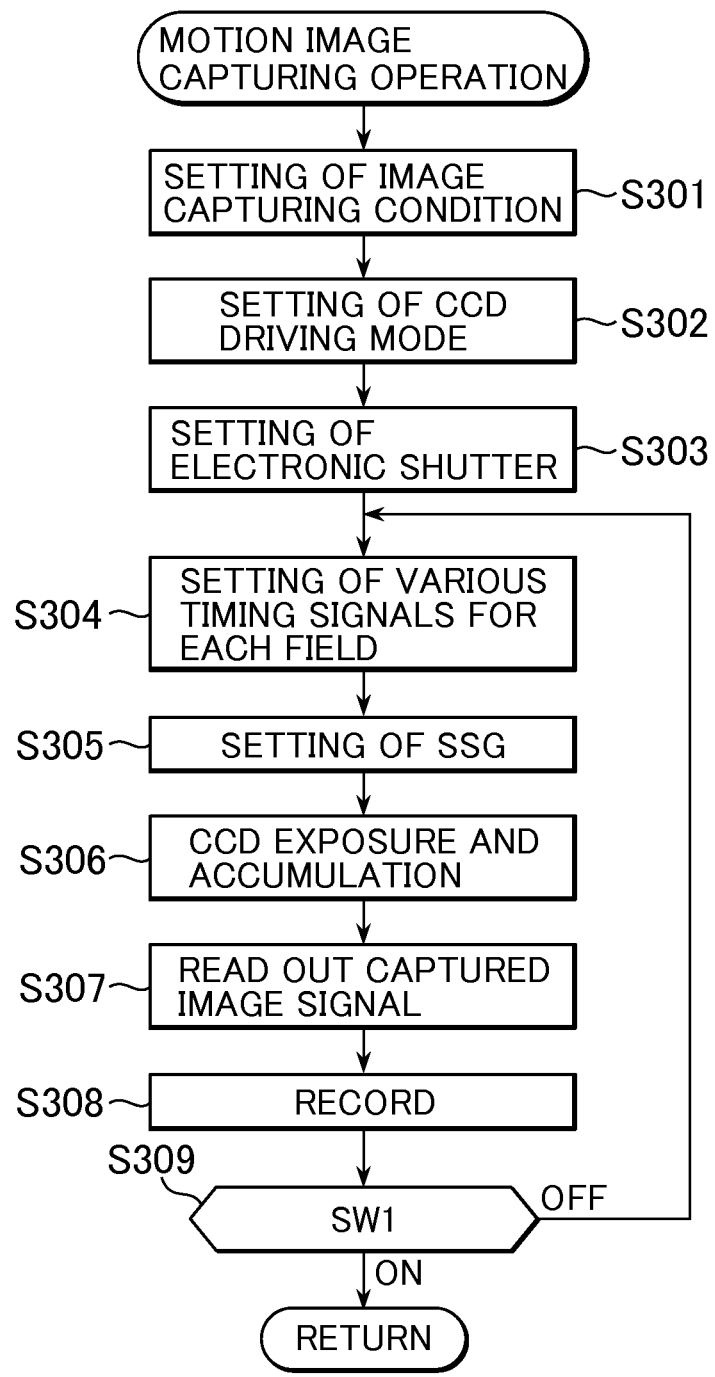

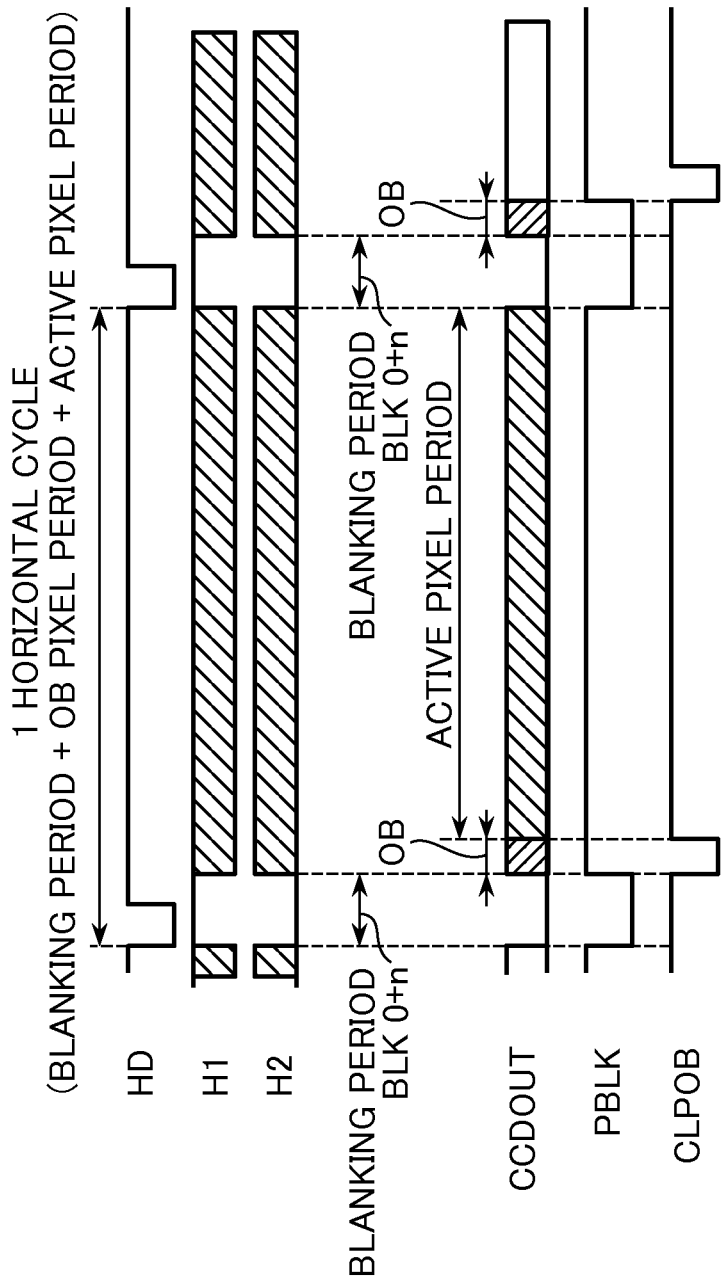

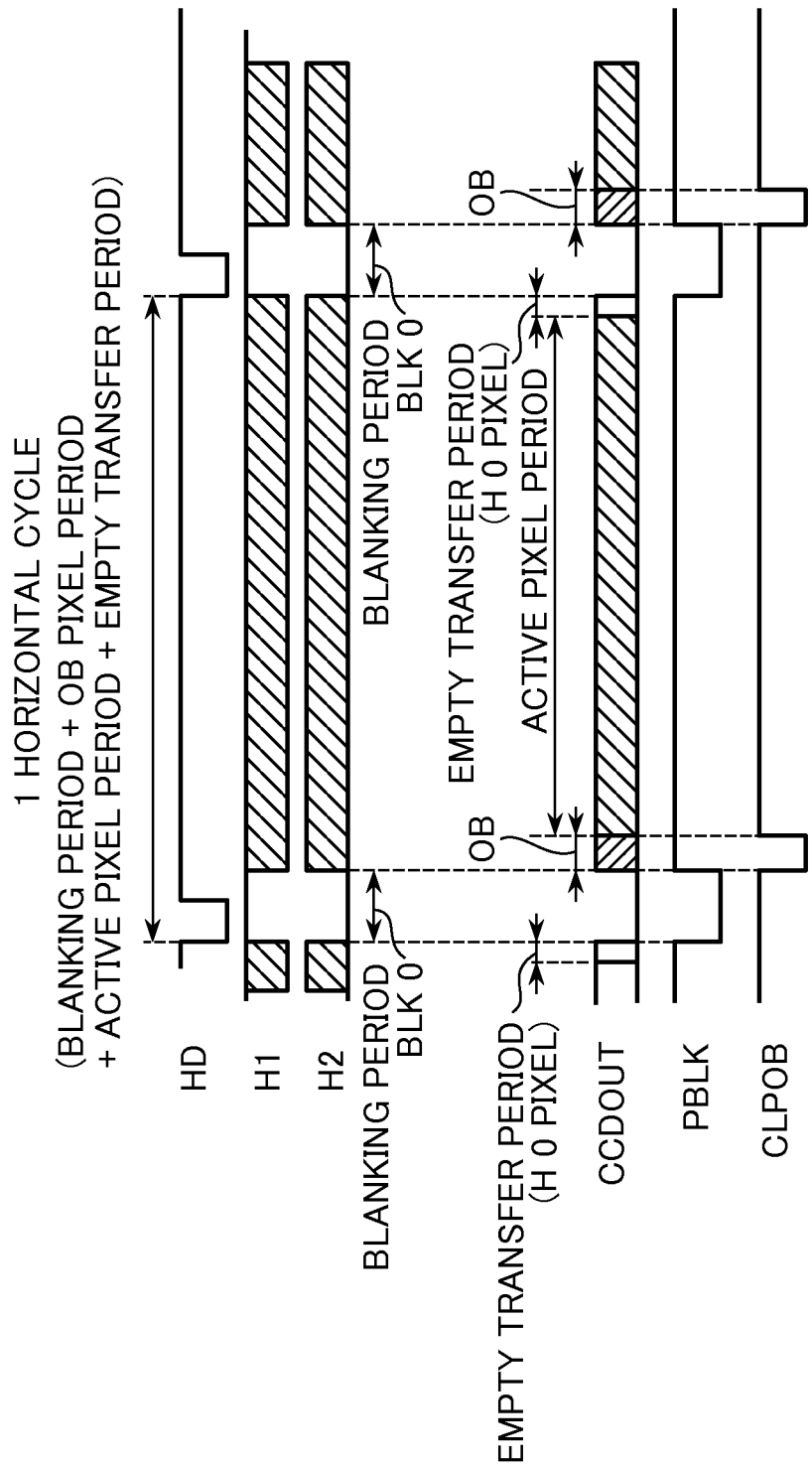

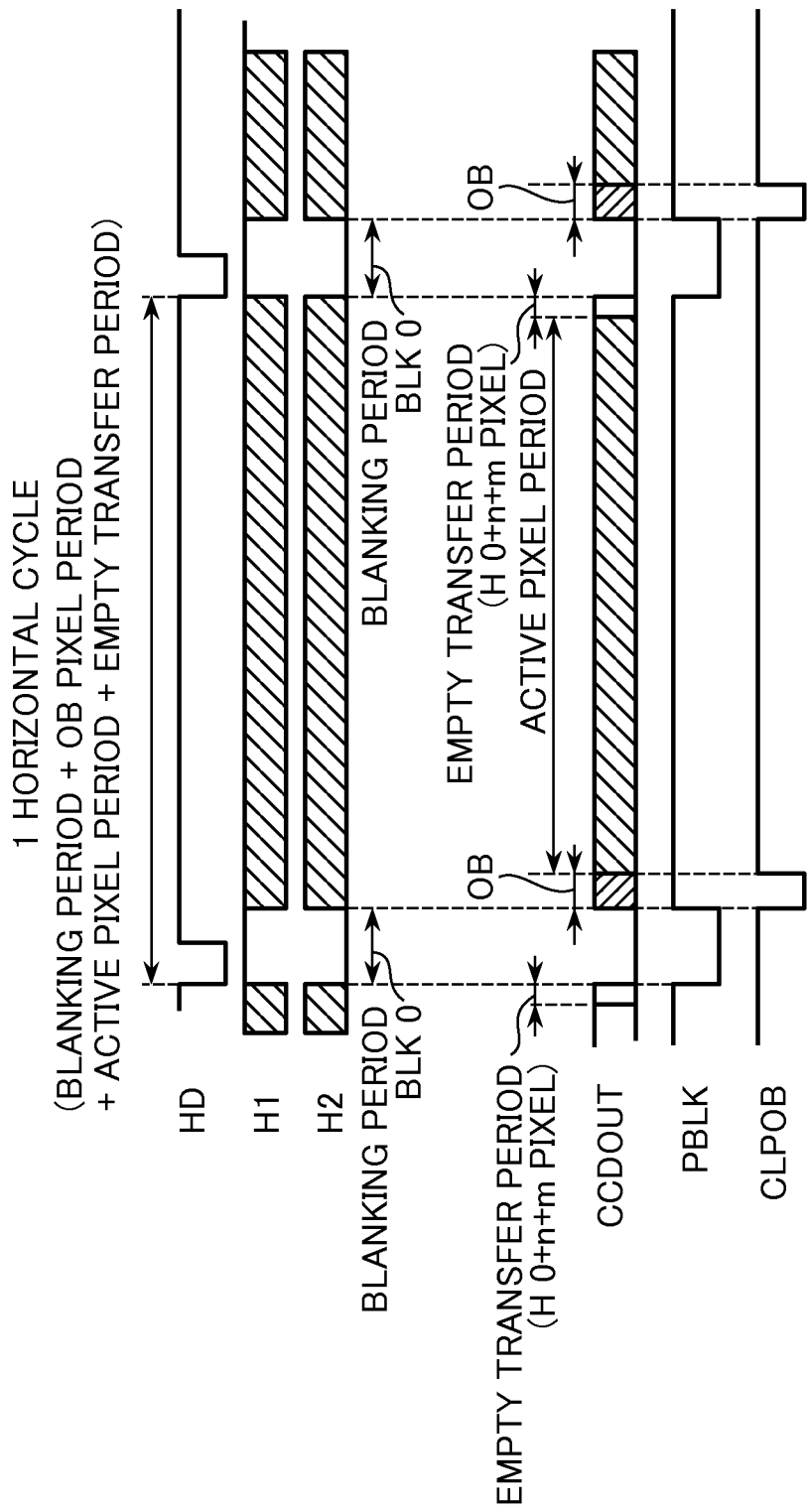

IMAGE PROCESSING APPARATUS, CONTROL METHOD, AND COMPUTER-READABLE STORAGE MEDIUM

BACKGROUND OF THE INVENTION

1. Field of the Invention

The present invention relates to an image processing apparatus that captures an image of a target object by use of a solid state image sensor, a control method thereof, and also relates to a computer-readable storage medium that stores therein a computer-readable program that makes a computer execute the control method.

2. Description of the Related Art

In recent years, image pick up apparatuses such as digital cameras, which are capable of recording and/or reproducing images captured by a solid state image sensor such as CCD (hereinafter may be referred to just as an "image sensor") via a storage medium such as a memory card equipped with solid state memory elements, have been developed actively and become widely used. In this kind of image pick up apparatus, improvements in resolution and operational speed that are concerned with capturing ability of still images and motion images have been demanded. In connection with this, a drive signal frequency for driving an image sensor, and also a drive signal frequency for driving an analog signal processing circuit, an A/D converter and a subsequent digital signal processing circuit have also been made much faster nowadays.

Further, in addition to an improvement of an image quality such as high quality and high fidelity, an easy function (handiness) of enabling a failure-proof image capturing operation in various image capturing occasions has also been demanded to image pick up apparatuses. For example, in order to properly capture the image of a target object moving at a high speed, just as a case of capturing an image of a sport scene or the like, or in order to suppress a so-called camera shake just in an occasion of taking a picture in a low-illuminated dark room or the like, there has been a remarkable progress in making a shutter speed faster. Furthermore, in order to enable an image capturing operation in a place like a museum, an aquarium and so forth in which an image capturing by use of a stroboscope is prohibited, image sensors with higher sensitivity have also been demanded. Now an explanation about a conventional image pick up apparatus is given below.

FIG. 8 is a block diagram showing a schematic configuration of an image capturing unit of a conventional image pick up apparatus such as a digital camera.

In FIG. 8, an image sensor (hereinafter CCD) 501 coverts an optical image of a target object to an image signal, which is an electric signal. An image capturing circuit 502 processes the image signal output from the CCD 501. An A/D converter 503 converts the thus processed analog image signal to a digital image signal. A rectangular frame denoted by a reference numeral 500 represents an analog signal processing area. A digital signal processing unit 504 carries out various signal processing such as storing a digital-converted image signal in a storage medium and displaying an image based on by the digital-converted image signal on a liquid crystal display monitor. A system control unit 509 contains therein a CPU that totally controls the operations of the digital camera.

An oscillation circuit 505 (OSC1) feeds an operation clock for a timing generator 506. An oscillation circuit 508 (OSC2) feeds an operation clock for the system control unit 509. The timing generator 506 feeds an operation clock (TGCLK) to a synchronous signal generator 507 (SSG). The synchronous signal generator 507 (SSG) counts the number of operation clock up to a predetermined number and generates a horizontal synchronous signal (HD) and a vertical synchronous signal (VD) so as to feed them to the timing generator 506 thereafter.

The timing generator 506 feeds various drive signals (H and V drive pulses) to the CCD 501 in synchronization with the horizontal and vertical synchronous signals. The timing generator 506 further feeds sampling clock signals to the image capturing circuit 502, the A/D converter 503, and also to the digital signal processing unit 504 respectively. The system control unit 509 instructs the synchronous signal generator 507 to generate horizontal and vertical synchronous signals and to set their cycles, and also controls the operation of the digital signal processing unit 504.

FIG. 9 is a view showing a schematic configuration of the CCD 501.

In FIG. 9, the CCD 501 is provided with a plurality of photoelectric conversion elements 511, a vertical transfer CCD (VCCD) array 512 and a horizontal transfer CCD (HCCD) array 513, wherein both the VCCD array 512 and HCCD array 513 are respectively also provided with a plurality of photoelectric conversion elements. Within the photoelectric conversion elements 511, photoelectric conversion elements 511a arranged in the leftmost side are shaded, while other photoelectric conversion elements 511b are arranged within a non-shaded active pixel area. Each of the photoelectric conversion elements 511 and corresponding one in the VCCD array 512 configure a paired unit, and an image sensing area is formed by providing a plurality of these paired units in a two-dimensional plane, wherein the light beams from a target object are converted into electric charges so as to form an image. The VCCD array 512 sequentially transfers the electric charges to the HCCD array 513, and the HCCD array 513 further transfers the thus transferred electric charges in the horizontal direction.

Describing this in detail, each the electric charges generated in the photoelectric conversion elements 511 is first transferred to the corresponding paired element in the VCCD array 512, and then the electric charges transferred to the VCCD array 512 are transferred to the HCCD 513 in the vertical direction sequentially, taking each of horizontal lines as one unit (in the line-by-line base). The electric charges thus transferred in the vertical direction are further transferred in the horizontal direction by the HCCD array 513, and finally converted to electric voltages to be output by an amplifier 514, which converts the electric charges to the electric voltages. Actually the VCCD array 512, the HCCD array 513 and the photoelectric conversion elements 511a and 511b, which configure the CCD 501 altogether, could be many more than the number of pieces described in FIG. 9. For example, although the photoelectric conversion elements 511a are illustrated as one vertical line in the leftmost position, there are, in fact, many more vertical lines in reality.

FIG. 10 is a block diagram showing a detailed configuration of the image capturing circuit 502.

In FIG. 10, the image capturing circuit 502 is provided with a correlated double sampling (CDS) circuit 600, an amplifier 601 and a clamp circuit 602. Generally, the CDS circuit 600 is provided in the down stream side of the CCD 501 so as to remove the reset noise component generated during the charge-transfer in the CCD 501. The output from the CCD 501 is composed of a field-through section and a motion image signal section. The field-through section becomes a base for the signal level of each pixel within one horizontal transfer cycle. The motion image signal section outputs a motion image signal in proportion to the amount of exposure.

The CDS circuit 600 is a noise canceling circuit that gains a difference between the level of the field-through section and that of the motion image signal section within the output signal of the CCD 501, and removes the correlated noise components within one pixel cycle from the motion image signal. The amplifier 601 amplifies the motion image signal output from the CDS circuit 600 to a predetermined signal level in accordance with the input range of the A/D converter 503 provided in its down stream side, and feeds it to the clamp circuit 602. The clamp circuit 602 adjusts a DC voltage level in such a manner that the each of the electric charges outputted from the pixels resided in the shaded part of the CCD 501 becomes a predetermined black reference value. The period during which the electric charge is outputted from each of the pixels in the shaded part is called an optical black (OB) period.

FIG. 11 is a timing chart showing the main signals for driving the above-noted image pick up apparatus.

In FIG. 11, the frequency of an operation clock of the oscillation circuit 505 in FIG. 8 is set to 33.75 MHz, and that of the oscillation circuit 508 in FIG. 8 is set to 27 MHz. The frequency of an operation clock for each pixel output from the CCD 501 is determined in accordance with the CCD drive signal generated by the timing generator 506, which is generated based on 33.75 MHz that is same as the frequency of the operation clock of the oscillation circuit 505. In other words, one pixel period (=one pixel cycle) of the output signal of the CCD 501 in this case is 29.6 ns (=1/33.75 MHz), within which the above-noted field-through section and the image motion signal section are included.

Further, in the timing generator 506, an S/H pulse (SH1) that samples and holds the signal level of the field-through section and an S/H pulse (SH2) that samples and holds the signal level of the motion image signal section are generated for each pixel so as to synchronize with the CCD drive signal.

The following apparatus has been proposed as a related art of the above-mentioned technical field (for example, Japanese Patent Laid-Open Publication (KOKAI) No. 2001-285726). In this Publication, a technique is proposed to suppress undesired beat noise generated when the frequency diffusion unit is used for processing of analog signals of an image pick up apparatus.

However, there has been such a problem in the above-noted conventional technique. That is, the speeding up of the drive frequency of an image signal can be a great factor to cause a deterioration of an signal-to-noise (S/N) ratio. Specially, within an image pick up apparatus such as a digital camera which is driven by a plurality of operation clock signals and both analog signals and digital signals are used therein, undesired clock signals leaked into analog image signals are likely to occur. The undesired clock signals leaked into image signals are superimposed on a generated image at equal pitches as an interfering clock noise.

Since the interfering clock noise is generated at equal pitches, even if its noise level is smaller than a heat-noise-type random noise of the CCD or the circuit, its conspicuousness has been a great problem. In addition, the above-noted deterioration of a signal-to-noise ratio of an image signal can be more conspicuous, when the sensitive condition of the image pick up apparatus is set to a high level, and the amplification level of an image signal in the image capture circuit is set to a large level.

For example, with the configuration as shown in FIG. 8, in accordance with the speeding up of the system operation and of the drive frequency of images signals, the S/H pulses (SH1 and SH2) and the sampling clock (ADCLK) for the A/D converter 503 have also been speeded up. Due to this, it has been made more difficult to remove the undesired clock noise component (system clock component) leaked into an image signal in the analog signal processing area 500 by a timing adjustment.

Here, a case in which the output of the CCD 501 is sampled by use of the S/H pulses (SH1, SH2) whose pixel-clock frequency is 33.75 MHz and a sampling clock (ADCLK) of the A/D converter 503 is now described hereinafter. When the system clock component (27 MHz) is leaked into image signals in the analog signal processing area 500, the periodic noise of 6.75 MHz (=33.75 MHz−27 MHz) that is a differential value of the frequency component remains in the image data after the sampling operation is completed.

The periodic noise of 6.75 MHz is an equal-pitch noise which has a frequency of one-fifth of 33.75 MHz that is a drive pulse of the CCD 501, and which has 5-pixel cycle, wherein one horizontal cycle is composed of 5 pixels. The feature of an equal-pitch noise generated by interfering pulses can be readily observed, although depending on its pitch size, in comparison with a heat-noise type random noise contained in the image sensing circuit 502 or in the CCD 501, thus it will be quite noticeable.

In the case of the CCD 501, a general configuration (timing chart) of one horizontal cycle is as shown in FIG. 12. In other words, one horizontal cycle is composed of a blanking period in which the transferring drive pulses H1 and H2 for the HCCD array 513 are stopped, and a pixel reading period during which the transferring pulses H1 and H2 for the HCCD array 513 are activated (OB pixel period+active pixel period).

Visual impression of an equal-pitch noise that is one-dimensionally superimposed on an image signal varies depending on the number of pixel clocks composing one horizontal cycle, with respect to a two-dimensional image expanded in the horizontal and vertical directions in the CCD area sensor.

For example, in the case of an equal-pitch noise of 5-pixel cycle, the noise pattern formed during that period contains 5 variations that are based on a coset of 5 in accordance with the number of pixel clocks composing one horizontal cycle as shown in FIGS. 13A to 13C, wherein symbols "N" in these figures correspond to integers. As can be observed from FIGS. 13A to 13E, although there is no change in noise pitches in the horizontal direction, since the angle of the noise pattern varies on an expanded two-dimensional image, it has been confirmed that the level of its noticeability varies.

FIG. 14 is a timing chart showing the timing for image capturing operation when taking a motion picture by the image pick up apparatus.

In FIG. 14, Tfc denotes a vertical cycle and is a period during which one field signal (one scene) is output when driving the CCD 501. The vertical cycle Tfc is set to an image capturing rate (for example, 60 scenes per second) that is suitable for smoothly capturing a motion image of a target object. VD denotes a vertical synchronous signal, and HD denotes a horizontal synchronous signal.

Exposure is controlled by mechanically opening and closing a mechanical diaphragm (not shown), adding electronic shutter pulses to the substrate's potential of the CCD 501 for a predetermined term Tfe, to thereby reset the electric charges of pixels in the direction of the substrate. The time period Tsc, which is a time duration from the moment of a completion of the reset of the pixel charges by the electronic shutter until the time on which the pixel charges of the photoelectric conversion elements 511 are read out by the VCCD 512, will be regarded as being a time period for exposure and accumulation in a filed signal of the CCD 501.

FIGS. 15A to 15C are views that depict an example of a noise pattern when the above-noted equal-pitch noise of the 5-pixel cycle that is superimposed on a one-dimensional image signal is expanded on a two-dimensional image of each field configuring a motion image at the time of reading out the motion image in the image pick up apparatus using a CCD area sensor.

FIGS. 15A to 15C represent a noise pattern in the case that three fields of the noise pattern shown in FIG. 13B are combined for one frame.

FIG. 15A is a view showing a state of noise patterns superimposed one another over the entire period including the blanking periods where no image is displayed. FIG. 15B is a view showing the state of a noise pattern in the image display area of the $K_{th}$ field of the field signals that vary in accordance with a lapse of time. FIG. 15C is a view showing the state of a noise pattern in which when the $K_{th}$ field image is displayed, the noise patterns of the $(K-1)_{th}$ and $(K-2)_{th}$ field images are superimposed on the $K_{th}$ field image, due to the responsibility of the display device and/or an afterimage effect.

As shown in FIGS. 15A to 15C, since one horizontal cycle is constant for each of the field signals, even though the position of the noise patterns expanded two-dimensionally on the field image shifts for each field, the angle of each of the noise patterns does not change. Due to this fact, noise patterns are observed on motion images composed of these field images, as if they scroll upward or sideward in accordance with a lapse of time, keeping their periodic features that can be observed at the same angle and an equal pitch. This makes the noise patterns conspicuous in some cases.

If the shift value of the position of the noise patterns between respective fields can be controlled well, a motion image in which a noise pattern is not so conspicuous can be configured to some extent by making the scrolling speed of the noise pattern faster.

However, as shown in FIG. 8, there is a configuration in which the oscillation circuit 505 for the operation clock (33.75 MHz) and the oscillation circuit 508 for the operation clock (27 MHz) are used. In other words, there are many cases in which multiple oscillation circuits are independently used corresponding to their individual frequencies. In such a configuration (so-called free-run configuration) in which the oscillation circuits are independent each other in accordance with their individual frequencies, as the phase of a noise pattern in each field moves depending on the precision and temperature drift of each oscillation circuit, a shift value of the position of the noise patterns between each field can be hardly controlled.

For example, it is possible to generate an operation clock of the oscillation circuit 505 (33.75 MHz) from the operation clock of the oscillation circuit 508 (27 MHz) by use of a Phase Locked Loop (PLL) circuit or the like. In this case, as the noise pattern and a phase relation between respective fields can be precisely determined, the shift value of the position of the noise pattern between respective fields may be controlled.

In this case, however, the operation clock (27 MHz) of the oscillation circuit 508 must be supplied by way of the PLL circuit to the timing generator 506 provided in the nearby area of the analog signal processing area 500 that is quite sensitive to noise, and due to this, there is such a great risk that the system operation clock (27 MHz) is likely to be leaked into analog image signals.

According to the above-noted Japanese Patent Laid-Open Publication (KOKAI) No. 2001-285726, a technique is disclosed that a beat noise that responds to a cycle of the frequency diffusion attributable to a frequency diffusing unit is superimposed on an image signal, whereby the beat noise is reduced by resetting the phase of the frequency diffusing unit at random timings in the horizontal transfer blanking period of the image sensor.

However, in case of a image pick up apparatus such as a digital camera that is not provided with the frequency diffusing unit as shown in FIG. 8, there has been a problem that undesired periodic noise generated in a unit other than the frequency diffusing unit cannot be reduced by the method disclosed in the above noted Laid Open document.

SUMMARY OF THE INVENTION

The present invention has been made for providing an image processing apparatus that makes a periodic noise in a captured image less noticeable without making the whole construction complicated, a control method thereof, and also a (computer-readable) storage medium for storing a computer readable program that causes a computer to execute the control method.

According to a first aspect of the present invention, there is provided an image processing apparatus comprising an image pick up unit that accumulates electric charges corresponding to an optical image of a target object, and transfers the thus accumulated electric charges and reads them out as image signals, and a control unit that drives the image pick up unit so as to read out the image signals consecutively from the image pick up unit in a field-by-field base, and also caries out a setting of the horizontal cycle of each field for driving the image pick up unit in such a manner as to make the horizontal cycle of each field different.

According to a second aspect of the present invention, there is provided a method of controlling an image processing apparatus which includes an image pick up unit that accumulates electric charges corresponding to an optical image of a target object, and transfers the thus accumulated electric charges and reads them out as image signals, wherein the method comprises the steps of setting a horizontal cycle for driving the image pick up unit to a first cycle, executing an image capturing operation by driving the image pick up unit at the first cycle so as to obtain a first image field signal, setting a horizontal cycle for driving the image pick up unit to a second cycle that is different from the first cycle, executing an image capturing operation by driving the image pick up unit at the second cycle so as to obtain a second image field signal, and generating a motion image from the first image field signal and the second image field signal.

According to a third aspect of the present invention, there is provided a computer-readable storage medium that stores a program for causing a computer to execute a method of controlling an image processing apparatus provided with an image pick up unit that converts an optical image of a target object to image signals, wherein the method comprises the steps of setting a horizontal cycle for driving the image pick up unit to a first cycle, executing an image capturing operation by driving the image pick up unit at the first cycle so as to obtain a first image field signal, setting a horizontal cycle for driving the image pick up unit to a second cycle that is different from the first cycle, executing an image capturing operation by driving the image pick up unit at the second cycle so as to obtain a second image field signal, and generating a motion image from the first image field signal and the second image field signal.

According to the present invention, a periodic feature of a noise pattern that is superimposed on each field image can be greatly reduced to make the image with less noticeable noise pattern. Due to this, the noise having periodicity in a captured image can be greatly reduced without making the whole structure complicated.

The above and other objects, features, and advantages of the invention will become more apparent from the following detailed description takes in conjunction with the accompanying drawings.

BRIEF DESCRIPTION OF THE DRAWINGS

FIG. 3 is a flowchart showing a process for processing a motion image performed by the image pick up apparatus.

FIG. 4B is a timing chart showing the length of a horizontal blanking period in each horizontal cycle when reading an image field signal of the second field that configures the motion image.

FIG. 6A is a timing chart showing the length of an empty transfer period in each horizontal cycle (1H) when reading an image field signal of the first field that configures a motion image captured by an image pick up apparatus according to a second embodiment of the present invention, FIG. 6C is a timing chart showing the length of an empty transfer period in each horizontal cycle when reading an image field signal of the third field that configures the motion image.

DETAILED DESCRIPTION OF THE PREFERRED EMBODIMENTS

The present invention will now be described in detail below with reference to the accompanying drawings showing a preferred embodiment thereof.

First Embodiment

Figure 1:
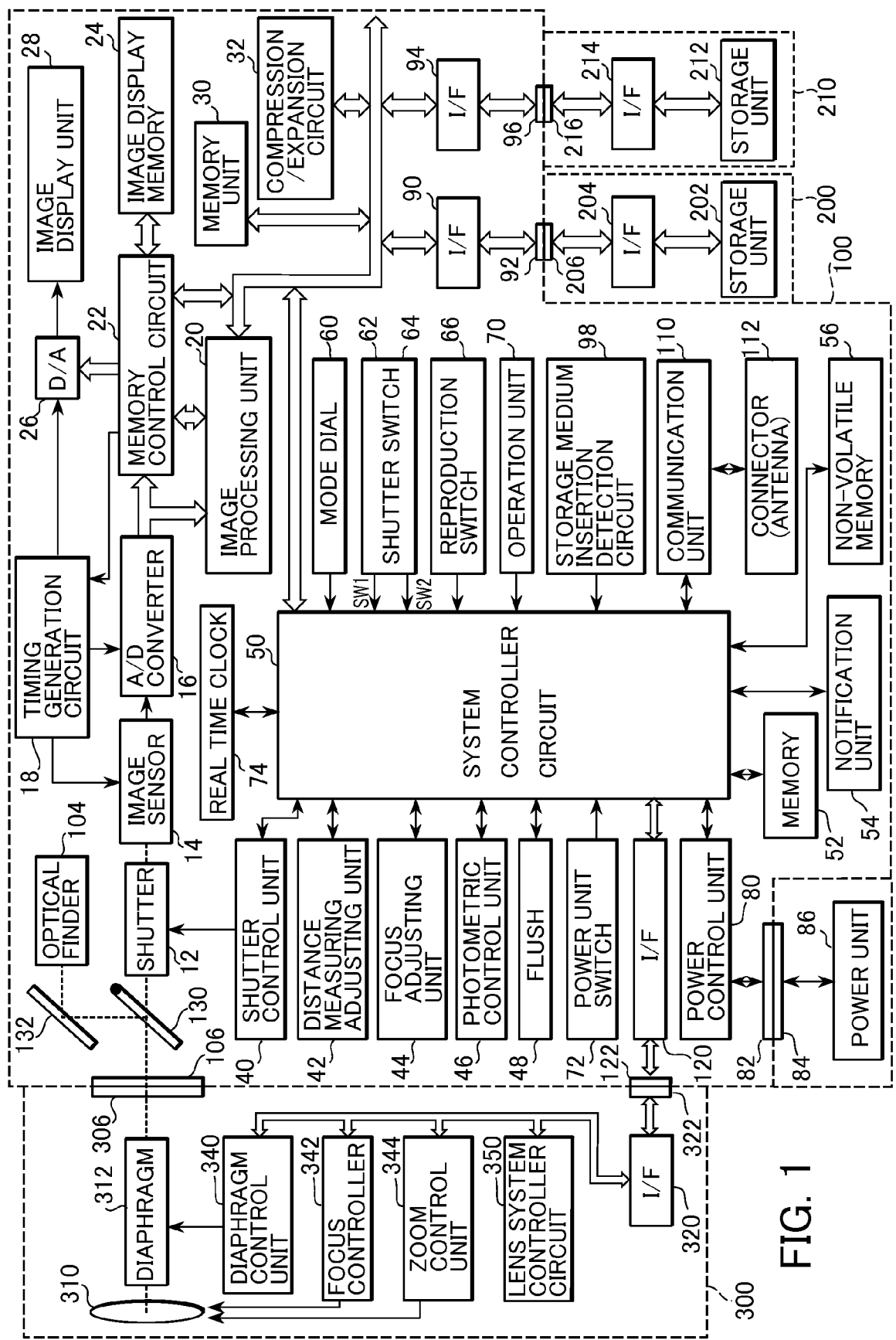
FIG. 1 is a block diagram showing a schematic configuration of an image pick up apparatus (an image processing apparatus) according to a first embodiment of the present invention.

FIG. 1 is a block diagram showing a schematic configuration of an image pick up apparatus (an image processing apparatus) according to a first embodiment of the present invention.

In FIG. 1, the image pick up apparatus is provided with an image pick up apparatus main body 100 (hereinafter may be referred to just as a "main body"), storage media 200 and 210 that are removably attached to the main body 100, and a lens unit 300 of a replaceable type. In this embodiment, the image pick up apparatus is considered to be a single-lens reflex digital camera equipped with a motion image capturing function.

First, a configuration of the lens unit 300 is described below. An imaging lens 310 is composed of a plurality of lenses. A diaphragm 312 adjusts the amount of light incident from the imaging lens 310. A lens mount 306 has various functions such as mechanically connecting the lens unit 300 to the main body 100, and also electrically connecting the lens unit 300 to the main body 100. An interface 320 controls an interface function for connecting the lens unit 300 to the main body 100 via the lens mount 306.

A connector 322 electrically connects the lens unit 300 to the main body 100. The connector 322 has functions of transmitting control signals, status signals, and data signals and so forth between the main body 100 and the lens unit 300, and also has a function of providing or being provided with electric currents of various voltages. The connector 322 may be configured as performing not only electrical communications, but optical and audio communications as well. A diaphragm control unit 340 controls the diaphragm 312 in cooperation with a shutter control unit 40 for controlling a shutter 12 provided in the main body 100, based on the photometric information from a photometric control unit 46.

A focus control unit 342 controls focusing of the imaging lens 310. A zoom control unit 344 controls zooming of the imaging lens 310. A lens system control circuit 350 controls the whole lens unit 300. Further, the lens system control circuit 350 is provided with a memory unit that stores therein constants, variables and programs for various operations. And still further, the lens system control circuit 350 contains a non-volatile memory which holds various kinds of information related to the lens unit 300, such as identification information such as a number peculiar to the lens unit 300, management information, function information (a diaphragm open value, a diaphragm minimum value, and a focal distance and so forth) and settings values of the past and the present.

Next, a configuration of the main body 100 is described below. The lens mount 106 mechanically connects the lens unit 300 to the main body 100. Mirrors 130 and 132 lead a light beam incident on the imaging lens 310 to an optical finder 104 by a single-lens reflex camera mode. It is to be noted that the mirror 130 may be either a quick return mirror or a semi-translucent mirror (half mirror). The shutter 12 has a diaphragm function. The light beam incident on the imaging lens 310, when capturing an image, is led, according to the single-lens reflex camera mode, to the diaphragm 312, the lens mounts 306 and 106, the mirror 130, the shutter 12 and finally to an image sensor 14 so as to be focused thereon as an optical image.

Figure 9:
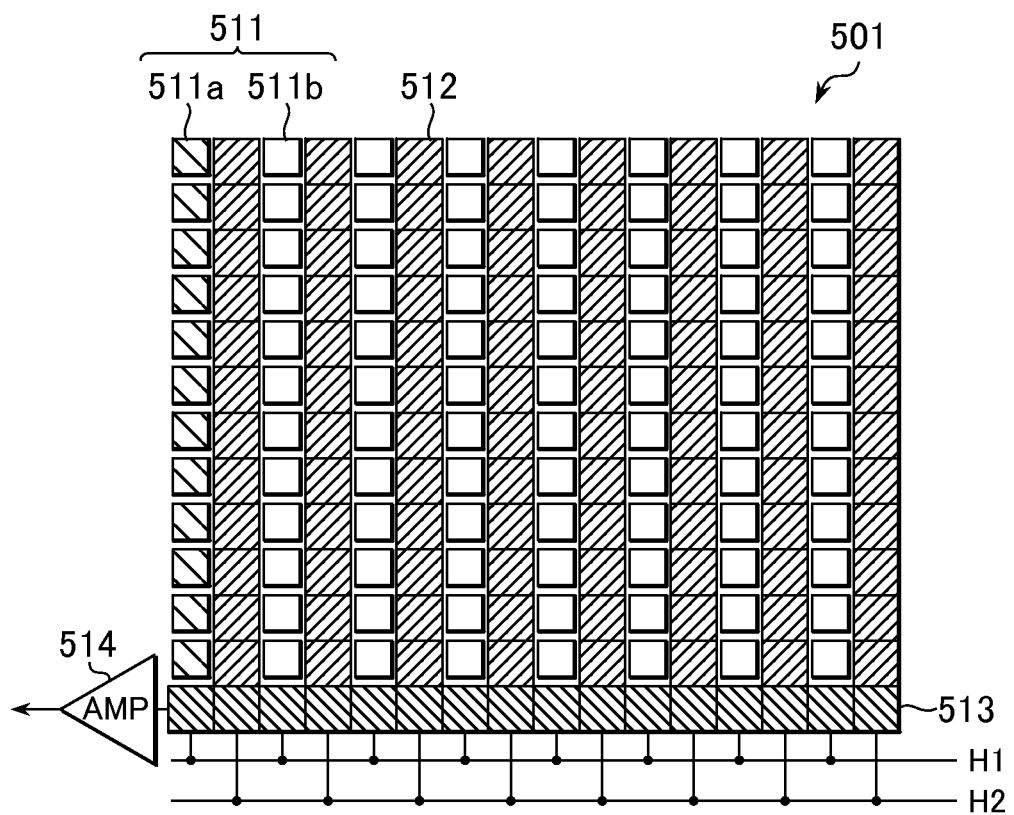
FIG. 9 is a view showing a schematic configuration of an image sensor shown in FIG. 8.
Figure 10:
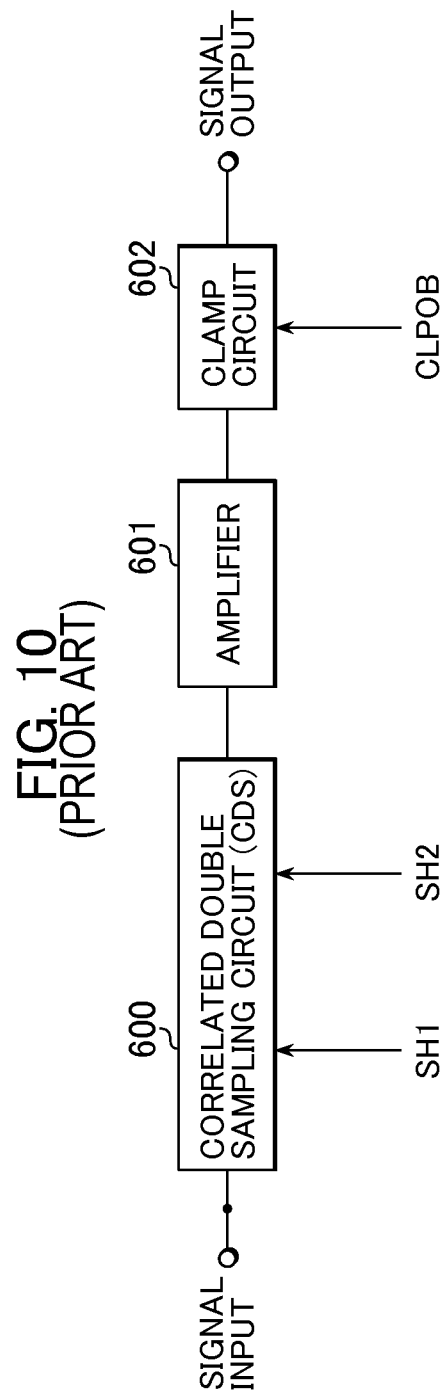
FIG. 10 is a block diagram showing a detailed configuration of an image capturing circuit shown in FIG. 8.
Figure 11:
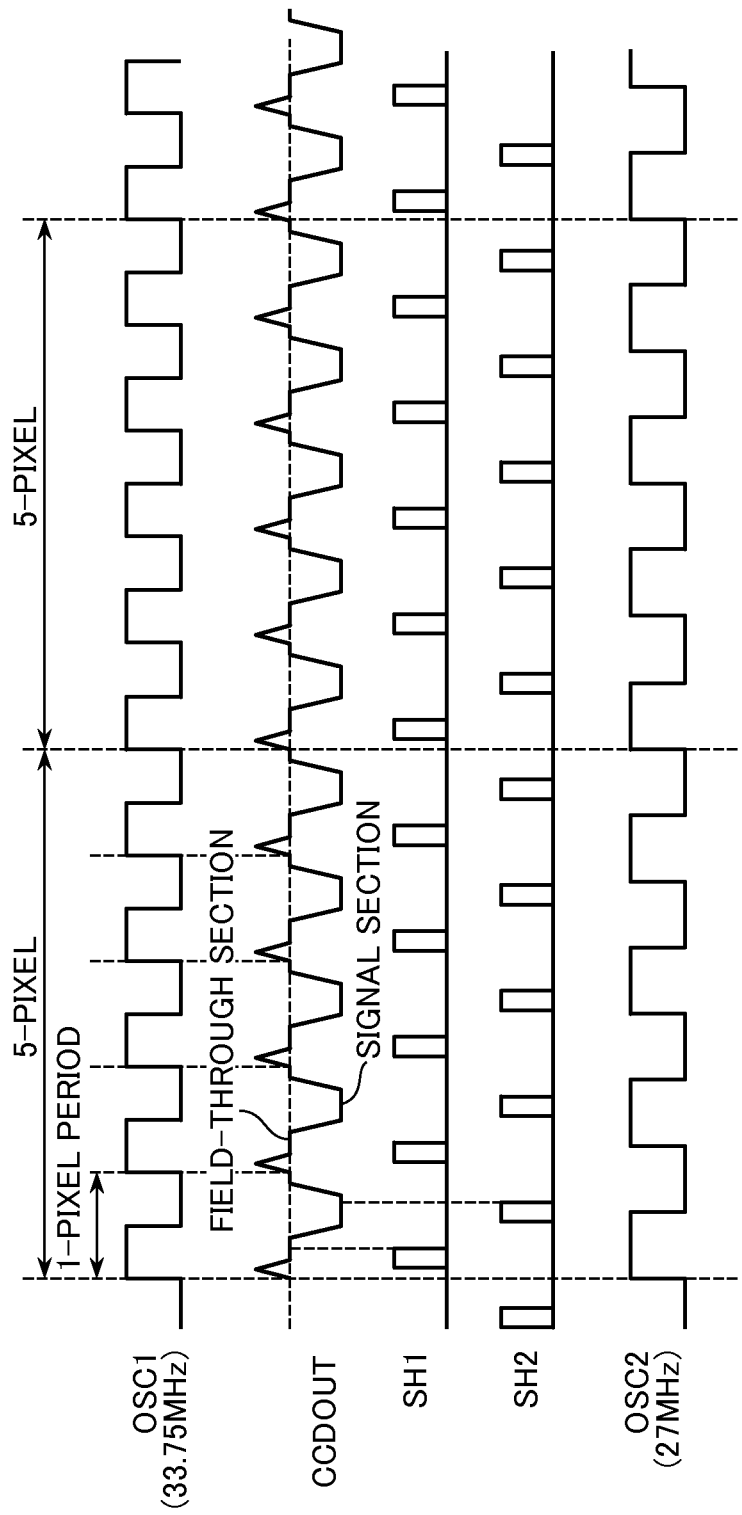
FIG. 11 is a timing chart showing the main signals for driving the image pick up apparatus shown in FIG. 8.
Figure 12:
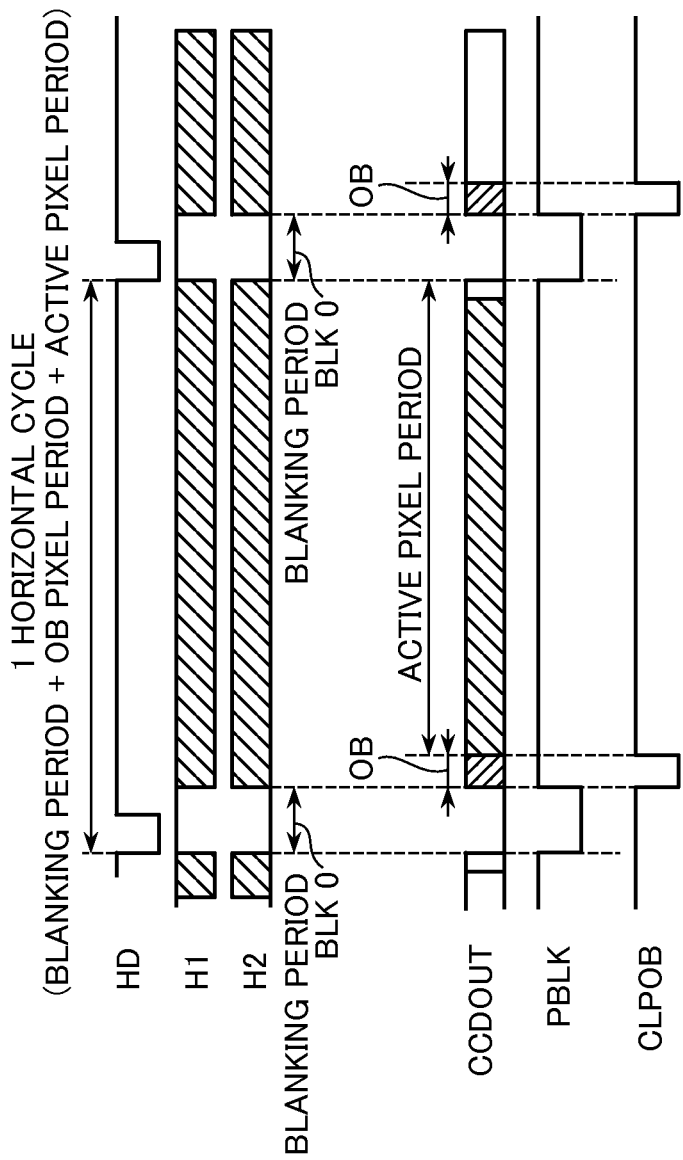
FIG. 12 is a timing chart showing a configuration of one horizontal cycle.
Figure 13A:
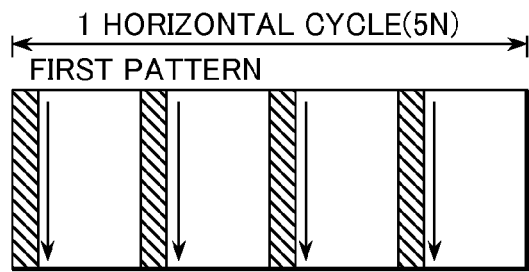
FIGS. 13A to 13E are views each showing an example of a noise pattern.
Figure 13B:
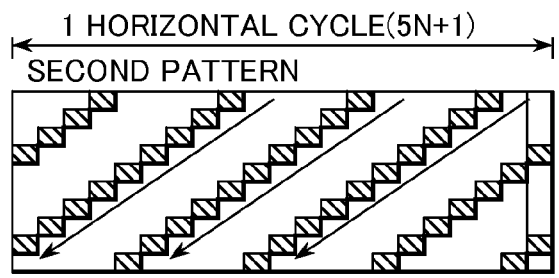
Figure 13C:
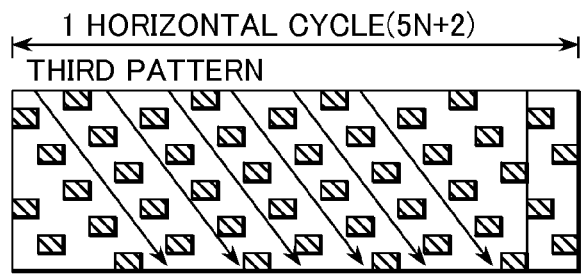
Figure 13D:
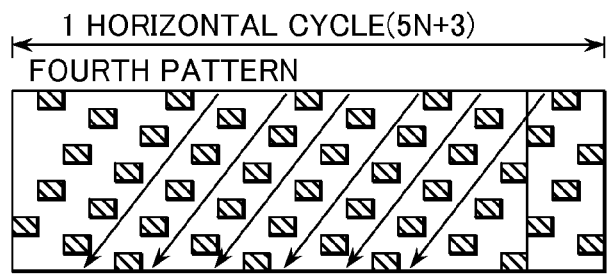
Figure 13E:
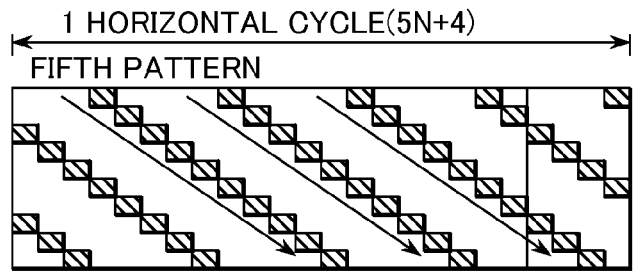

The image sensor 14 (image pick up unit, sensitivity setting unit) captures an image by accumulating electric charges corresponding to the optical image of a target object and then transferring sequentially the thus accumulated electric charges so as to be read out thereafter as an image signal (electric signal). In this embodiment, the image sensor 14 is configured as an interline-type CCD solid-state image sensor that has the same structure of the CCD 501 shown in FIG. 9. The image sensor 14 reads out all the electric charges by partial read-out operations of n times (plural times). In other words, one frame is divided into n fields so as to be read out all.

An A/D converter 16 converts an analog image signal output from the image sensor 14 to a digital image signal. The image sensor 14 and the A/D converter 16 are included in an analog image signal processing area that processes analog image signals. A timing generation circuit 18 supplies clock signals and control signals to each of the image sensor 14, the A/D converter 16, and to a D/A converter 26. The timing generation circuit 18 is controlled by a memory control circuit 22 and a system control circuit 50.

An image processing circuit 20 (signal processing unit) executes a predetermined pixel interpolation processing and a color conversion processing with respect to an image data fed from the A/D converter 16 or from the memory control circuit 22. The image processing circuit 20 also performs a predetermined calculation by use of an image data output from the A/D converter 16. And further the image processing circuit 20 carries out the processing such as an auto focus (AF) operation in a TTL (Through The Lens) mode, an auto exposure (AE) operation and a Flash Exposure Bracketing (EF) operation, so that the system control circuit 50 can control a shutter controller 40 and a focus adjusting unit 44 based on a result of the calculation. The image processing circuit 20 further carries out a predetermined calculation by use of an image data output from the A/D converter 16, and also an Automatic White Balance processing (AWB) in the TTL mode based on the result of the predetermined calculation.

It should be noted that since in this embodiment the focus adjusting unit 44 and the photometric control unit 46 are provided for an exclusive use, the configuration may be made in such a manner that the above-noted AF, AE and the EF operations are performed using both of the focus adjusting unit 44 and the photometric control unit 46, but not using the image processing circuit 20. And further, it can be arranged such that the AF, AE and the EF operations are carried out using both of the focus adjusting unit 44 and the photometric control unit 46, and also using the image processing circuit 20 in addition.

The memory control circuit 22 controls the A/D converter 16, the timing generation circuit 18, the image processing circuit 20, an image display memory 24, the D/A converter 26, a memory 30, and also a compression/expansion circuit 32. The data output from the A/D converter 16 are written into the image display memory 24 or the memory 30 by way of both of the image processing circuit 20 and the memory control circuit 22, or only the memory control circuit 22.

An image display unit 28 contains a TFT mode LCD or the like. The image data to be displayed that have been written into the image display memory 24 is displayed on the image display unit 28 via the D/A converter 26. By sequentially displaying the image data using the image display unit 28, an electronic view finder function (EVF) can be realized. Further, the image display unit 28 can arbitrarily set its display mode to ON and/or OFF by an instruction from the system control circuit 50, and when the display mode is set to OFF, an electric power consumption of the main body 100 can be greatly reduced.

The memory 30 is provided to store the captured still images and motion images, and has enough storage capacity for storing a predetermined number of still images and a predetermined time of motion images. Due to this, even in a case of a sequential image capturing mode, in which a plurality of still images are continuously captured, or in a case of a panorama image capturing mode, a vast amount of image data can be written into the memory 30 at high speed. Still further, the memory 30 can be used as a working area of the system control circuit 50.

The compression/expansion circuit 32 carries out a compression and expansion of the image data using a conventional known compression method such as the Adaptive Discrete Cosine Transform (ADCT) method. The compression/expansion circuit 32 reads out the image data stored in the memory 30 to carry out compression or expansion, and writes the image data whose processing has been completed, into the memory 30 again.

The shutter control unit 40 controls the shutter 12 in cooperation with the diaphragm control unit 340 that controls the diaphragm 312 on the basis of the photometric information from the photometric control unit 46. The focus adjusting unit 44 carries out the AF operation. The light beam incident on the imaging lens 310 within the lens unit 300 forms an optical image on the image sensor 14 in a single-lens reflex camera mode by way of the diaphragm 312, the lens mounts 306 and 106, the mirror 130 and a sub mirror for a focus adjustment (not shown). The focus adjusting unit 44 measures the focal state of the image focused as the optical image. The photometric control unit 46 carries out the AE operation, that is, measuring the exposed state of the image focused as the optical image.

A flush 48 emits a light in association with a movement of the shutter 12. The flush 48 has functions of emitting an AF auxiliary light and adjusting a flush light. The photometric control unit 46 has also the EF processing function in association with the flush 48.

It should be further noted, as mentioned above, that the exposure control and the AF control can be performed based on a result of the calculation by the image processing circuit 20, using an image date from the A/D converter 16. In this case, the system control circuit 50 can carry out the exposure control and the AF control in the video TTL mode with respect to the shutter control unit 40, the diaphragm control unit 340 and the focus control unit 342.

Further, the AF control may be performed by using a result of the measurement by the focus control unit 44 and a result of the calculation that the image processing circuit 20 carried out with respect to the image data from the A/D converter 16. Still further, the exposure control may be performed by using a result of the measurement by the photometric control unit 46 and a result of the calculation that the image processing circuit 20 carries out with respect to the image data from the A/D converter 16.

The system control circuit 50 (including the control unit, the signal processing unit, the sensitivity setting unit, and the exposure control unit) controls the main body 100, and is provided with a CPU and an inner memory therein. The system control circuit 50 controls the image sensor 14 such that the image signals (electric signals) are sequentially read out in a field-by-field base from the image sensor 14, so as to make the horizontal cycle for driving the image sensor 14 different in a field-by-field base. Further, the system control circuit 50 also controls to generate a motion image from the sequentially read out image signals from the image sensor 14 in a field-by-field base. Still further, the system control circuit 50 also performs each of the processes in the flowcharts shown in FIGS. 2, 3 and 7 based on a control program.

A memory 52 stores constants, variables and control programs for enabling the operation of the system control circuit 50. A non-volatile memory 56 is an electrically recordable and erasable memory that stores control programs, various parameters and various set values including an ISO sensitivity or the like, a case in point being an EEPROM.

A notification unit 54 notifies outward of the operational state thereof and a message or the like, using letters, images, voices and so on, in accordance with the execution of programs in the system control circuit 50. As the notification unit 54, although a display unit providing a visual indication by using an LED, an LCD and so on, a sound emitting element using an audio and so forth are typically used, it can be made up of a combination of more than one of these devices. When a display unit is provided as the notification unit 54, it is mounted on a readily observable position in close proximity to an operation unit 70 of the main body 100. The image pick up apparatus can contain one or more notification units 54. Also, some functions of the notification unit 54 are provided within the optical finder 104.

Among the contents to be notified by the notification unit 54, those displayed on the LCD or the like include indications concerning an image capturing mode, such as the indication of single/continuous image capturing, that of self-timer and so on. Further, there are more indications regarding the recording operation, such as the indication of compression rate, number of pixels of each captured image, number of recorded images, and number of images which can be captured further and so on. There are also more indications regarding the image capturing condition such as the indication of shutter speed, diaphragm value, exposure correction value, flush, red-eye reduction and so on. Still further, apart from those indications, there are also more indications such as the indications of macro-image capturing, buzzer setting, remained battery for clock, residual battery capacity, error, information by plural order numerals, and the indication of mounted/dismounted state of the storage media 200 and 210. In addition, there are also more indications such as the indication of the attached/detached state of the lens unit 300, communication I/F operation, date/time, and the indication of the connection state with an external computer and so on.

Further, among the contents to be notified by the notification unit 54, those displayed on the optical finder 104 includes the indications of focus matching, completion of preparation for image capturing, warning of camera shake, flush charging state, completion of flush charging, shutter speed, diaphragm value, exposure correction value, and the indication of writing operation into storage medium and so on.

Still further, among the contents to be notified by the notification unit 54, those displayed on the LED includes the indications of focus matching, completion of preparation for image capturing, warning of camera shake, flush charging state, completion of flush charging, writing operation into storage medium, information about macro-image capturing setting, secondary battery charging and so on. In addition, among more contents to be notified by the notification unit 54, those indicated by a lamp or the like includes indication of information about self timer mode, which may be used together with the AF auxiliary light.

The operational devices (60, 62, 64, 66 and 70) are used to input various operational instructions to the system control circuit 50, and are provided with independently or a combination of a dial, a switch, a touch panel, a pointing device through detection by a line of vision, and a voice identification unit. The mode dial switch 60 is used for starting an operation in the still image capturing mode and in the motion image capturing mode differently. The shutter switch SW1 62 is set to ON in the half way of its depressing operation of a shutter button (not shown) so as to instruct a starting of the AF operation, AE operation, AWB operation and the EF operation.

The shutter switch SW2 64 is set to ON at the completion of its depressing operation so as to instruct a starting of a series of operations including the operation of exposing, developing and recording. First of all, in the exposing operation, the signal read out from the image sensor 14 is fed to the A/D converter 16, subsequently to the memory control circuit 22, and finally to the memory 30 so as to be written therein as an image data. In the developing operation, a result of the calculations executed in the image processing circuit 20 and the memory control circuit 22 is used to carry out the developing operation. In the recording operation, the image data read out from the memory 30 are compressed in the compression/expansion circuit 32, and written thereafter into the storage medium 200 or 210. A reproduction switch 66 instructs a starting of the image reproduction by which the images that were captured in the image capturing mode are read out from the memory 30 or the storage medium 200 or 210 and displayed on the image displaying unit 28.

The operation unit 70 is provided with various buttons and touch panels, such as, for example, a menu button, a setting button, a macro button, a multi-display reproduction page-changing button, a flush setting button, a single/continuous/self-timer switching button, a menu shifting + (plus) button, and a menu shifting − (minus) button. Further, the operation circuit 70 further includes a reproduction image shifting + (plus) button, reproduction image shifting − (minus) button, and also reproduction switch imaging quality selection button that can set various functional modes such as a reproduction mode, a multiple display reproduction/deletion mode and a PC connection mode. Furthermore, an exposure correction button and a date/time setting button are also included.

It should be noted that functions of each of the plus buttons and minus buttons can select values and functions more easily by providing a rotational dial switch, and an ISO sensitivity setting button, which can set the level of ISO sensitivity by changing the setting of a gain of the image sensor 14 or the image processing circuit 20, may also be provided.

In addition, there are also a select/switch button for setting the selection and switching of various functions when performing an image capturing and reproduction, for example, in the panorama mode, and a determination/execution button for setting the determination and execution of various functions when performing an image capturing and reproduction in the panorama mode and so on. Further, there are also an image display ON/OFF switch for setting ON/OFF of the image display unit 28, and a quick review ON/OFF switch for setting a quick review function that automatically reproduces captured image data immediately after the completion of an image capturing operation.

Further, there is also a compression mode switch in order to select a compression rate of JPEG compression, or to select a CCDRAW mode for directly digitalizing a signal from the image sensor 14 and storing it on a storage medium. Further, there is also an AF mode setting switch that can set a one-shot AF mode and a servo AF mode. In the one-shot AF mode, an auto focus operation starts when the shutter switch SW1 (62) is depressed, and once a focus matching is completed, then the focus-matched state is maintained. In the servo AF mode, during the period in which the shutter switch SW1 (62) is being depressed, a continuous auto focus operation is maintained.

A power switch 72 is used for switching the power ON/OFF of the main body 100. Further the power switch 72 can also switch ON and OFF the lens unit 300, an external flush, and the storage media 200 and 210 which are all attached to the main body 100. A power control unit 80 is provided with a battery detection circuit, a DC-DC converter, a switching circuit for switching a block to be powered. The power control unit 80 detects the installation of a battery, the type of the battery, and the residual battery capacity, and controls the DC-DC converter based on a result of the detection and an instruction of the system control circuit 50, and provides each of the structural elements including the storage media 200 and 210 with necessary voltage for necessary period.

Connectors 82 and 84 connect the main body 100 and a power unit 86. The power unit 86 is composed of a primary battery (Alkali battery, Lithium battery), a secondary battery (NiCd battery, NiMH battery, Li-ion battery, Li-Polymer battery) and an AC adapter and so on. Interfaces 90 and 94 perform interfacing of the main body 100 and the storage media 200 and 210. Connectors 92 and 96 connect the main body 100 and the storage media 200 and 210. A storage medium installation detection circuit 98 detects whether the connectors 92 and/or 96 are connected to the storage medium 200 or 210.

It should further be noted that although in this first embodiment a case in which interfaces and connectors for attaching the storage media to the main body are two systems is taken up, it is not limited to this. In fact, the interfaces and connectors can be of a singular system or plural systems. Further, the interfaces and connectors of different standards can also be combined.

The interfaces and connectors can be made up by using the cards in compliance to the following various standards of storage medium such as a PCMCIA (Personal Computer Memory Card International Association) card, a CF (Compact Flush®) card, and an SD card. When the interfaces 90, 94 and the connectors 92, 96, which are in compliance to the above-mentioned standards, are used, various communication cards are connectable.

As communication cards, there are a LAN card, a modem card, a USB (Universal Serial Bus) card, an IEEE (Institute of Electrical and Electronics Engineers) 1394 card, a P1284 card, a SCSI (Small Computer Memory System Interface) card, a PHS and so on. By connecting these types of communication cards, image data or management information appended to the image data can be transmitted between the main body 100 and other peripheral devices such as a computer, a printer and the like.

A light beam incident on the imaging lens 310 is led to the optical finder 104 by way of the diaphragm 312, the lens mounts 306, 106 and the mirrors 130, 132, so as to be focused on it as an optical image. Due to this, without using the electric finder function provided by the image display unit 28, a shooting only with the optical finder 104 is made possible. Further, within the optical finder 104, information corresponding to a part of the functions of the communication unit 54 such as focus matching state, a warning of camera shake, a flush charging state, shutter speed, a diaphragm value, exposure correction and so on can be displayed.

A communication unit 110 includes various types of communication functions such as RS232C, USB, IEEE1394, P1284, SCSI, modem, LAN, a wireless communication and so on. A connector 112 (antenna) is used for connection or wireless communications between the main body 100 and other devices via the communication unit 110. A interface 120 controls an interface function for connecting the main body 100 and the lens unit 300 within the lens mount 106.

A connector 122 electrically connects the main body 100 and the lens unit 300. The connector 122 performs a bidirectional transmission of a control signal, a status signal, a data signal and so on between the main body 100 and the lens unit 300, and also has a function of feeding electric current of various voltages. Further, the connector 122 can be configured as performing not only electric communications, but also optical communications, audio communications and so forth, just like the above noted connector 322. It should also be noted that whether or not the lens unit 300 has been mounted to the lens mount 106 and/or the connector 122 can be detected by a lens mount detection unit (not shown).

Next, the configuration of the storage media 200 and 210 is described below. Each of the storage media 200 and 210 contains, for example, a memory card or a hard disk. The storage medium 200 is provided with a storage unit (a semiconductor memory or a magnetic disk) 202, an interface 204, and a connector 206 that connects to the main body 100. Samely, the storage medium 210 is provided with a storage unit 212, an interface 214 and a connector 216.

As concrete examples of the storage media 200 and 210, there are, a memory card such as a PCMCIA card and a Compact Flush Card®, a micro DAT, an optical magnetic disk, an optical disk such as CD-R and CD-RW, and also a phase-change optical disk such as a DVD.

Figure 2:
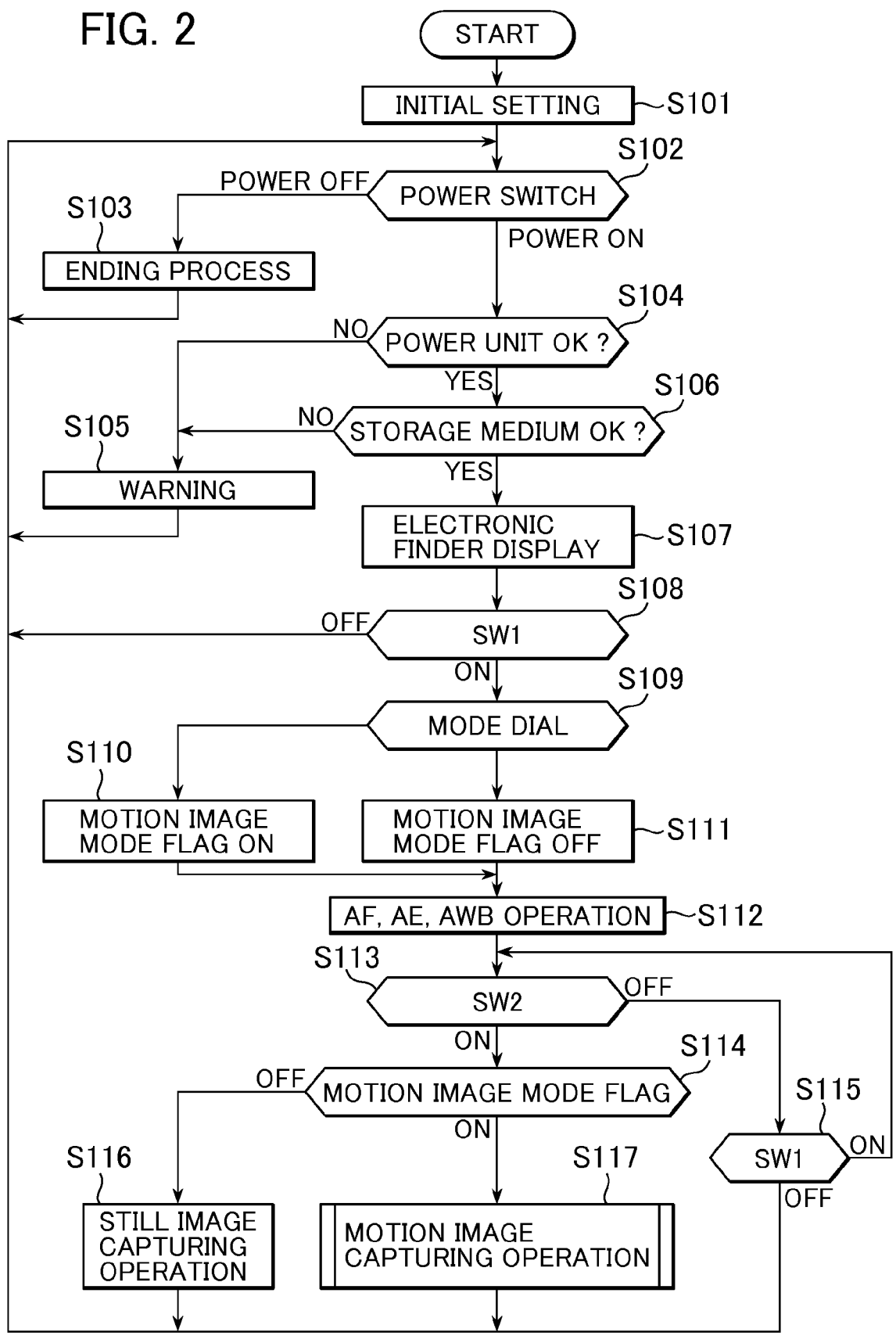
FIG. 2 is a flowchart showing a basic operation of the image pick up apparatus.

FIG. 2 is a flowchart showing a basic operation of the image pick up apparatus.

In FIG. 2, in accordance with a power-on operation caused by such as a battery change of the image pick up apparatus, the system control circuit 50 initializes flags, control variables and so on, and performs required predetermined initial settings in each section of the main body 100 (Step S101). Then, the system control circuit 50 determines a set position of the power switch 72 (Step S102).

In the case that the power switch 72 has been set to OFF, the system control circuit 50 changes the displayed state of each display unit to an "End" state, and stores necessary parameters including flags and control variables, set values and set modes into the non-volatile memory 56. Thereafter, the system control circuit 50 performs a predetermined end processing such as switching OFF an unnecessary power unit of each part of the image pick up apparatus including the image display unit 28 by the power unit control unit 80 (Step S103), and thereafter terminates this process.

On the other hand, in the case that the power switch 72 has been set to ON, the system control circuit 50 determines as to whether there is any problem with the residual capacity and operational state of the power unit 86 composed of a battery or the like through the power control unit 80 (Step S104). When it is determined that there is a problem with the power unit 86 ("NO" in Step S104), then the system control circuit 50 makes a predetermined warning by an image or a voice using the communication unit 54 (Step S105), and the goes back to Step S102.

On the other hand, if there is not any problem with the power unit 86 ("YES" in Step S104), then the system control circuit 50 determines whether the storage medium 200 or 210 is installed in the main body 100 through the storage medium installation detection circuit 98. Further, if the storage media 200 and/or 210 have been installed, the system control circuit 50 obtains management information regarding the image data therefrom.

Further, the system control circuit 50 checks whether there is any problem with the operational state of the storage media 200 and/or 210, specially whether there is any problem with the storing and/or reproducing operation of the image data with respect to these storage media 200 and/or 210. When it is determined that there is a problem with the storing and/or reproducing operation ("No" in Step S106), then the system control circuit 50 caries out a predetermined notification of warning by an image or a voice using the communication unit 54 (Step S105), and thereafter the procedure returns to step S102.

On the other hand, if it is determined that there is no problem with storing and/or reproducing operation ("Yes" in Step S106), the system control circuit 50 starts displaying on the electronic finder (Step S107). The system control circuit 50 controls, in the electronic finder display mode, the timing generation circuit 18 with the shutter 12 opened, and reads out electric charges in the image sensor 14 at a predetermined cycle by a line-reducing method or line-increasing method. By reading out the electric charges in the image sensor 14, using the aforementioned method, the number of pixels is reduced to a proper number of lines suitable to the electronic finder display mode, and the rate of display is made faster to a required level suitable to display a motion image on the electronic finder display.

The image signals (electric signals) read out from the image sensor 14 are sequentially written into the image display memory 24 by way of the A/D converter 16 and the memory control circuit 22 as image data. The system control circuit 50 sequentially displays the image data in the image display memory 24 on the image display unit 28 by way of the memory control circuit 22 and the D/A converter 26. In this way, the electronic finder display is realized.

Next, the system control circuit 50 checks the state of the shutter switch SW1 62 (Step S1081), and if the shutter switch SW1 62 is not depressed, then the procedure returns to step S102. If the shutter switch SW1 62 is depressed, in other words, if the shutter button is not completely depressed in the half way, then the system control circuit 50 determines the state of the mode dial 60 (Step S109). Here, if the mode dial 60 has been set to a still image capturing mode, the system control circuit 50 resets (set to OFF) a motion image mode flag (Step S111), whereas if the mode dial 60 has been set to a motion image capturing mode, then the system control circuit 50 sets the motion image flag to ON (Step S110).

Next, the system control circuit 50 performs the AF operation, the AE operation, and the AWB operation (Step S112). In step S112, the system control circuit 50 first performs the AF operation so as to adjust the focal point of the imaging lens 310 to a target object to be captured. At this time, the system control circuit 50 inputs an optical beam incident on the imaging lens 310 to the focus adjusting unit 44 by way of the diaphragm 312, the mount 306 and 106, the mirror 130, and also a distance measuring sub mirror (not shown), and checks the focus matching state of the image focused as an optical image.

The system control circuit 50 drives the imaging lens 310 by use of the focus control unit 342 and simultaneously performs the AF control for detecting the focus matching state by use of the focus adjusting unit 44 until it determines that the focal point has been matched. When the system control circuit 50 determines that the focus has been matched, it determines one measured point at which the focus is matched among a plurality of measured points within an image display screen, and stores the data of the thus determined measured point together with the focus matched data and the set parameter (or just the set parameter) in an internal memory within the system control circuit 50 or the memory 52.

Next, the system control circuit 50 performs the AE operation. Here, the system control circuit 50 first inputs the light beam incident on the lens 310 to the photometric control unit 46 by way of the diaphragm 312 and a photometric lens (not shown), and measures the exposure state of the image focused as an optical image. Then, the system control circuit 50 continues the photometric observation amount by use of the photometric unit 46 until it determines that the exposure level is proper.

When the system control circuit 50 determined that the exposure level is proper, it stores the photometric data and the set parameter (or just the set parameter) in the internal memory within the system control circuit 50 or the memory 52. Further, the system control circuit 50 determines the sensitivity value (Dv value), the diaphragm value (Av value) and the shutter speed (Tv value) in accordance with a result of the detected exposure level. Further, the system control circuit 50 also sets a flush flag and also a flush 48 in accordance with the result of the photometric operation, if necessary. Still further, the system control circuit 50 determines a time for accumulating the charges of the image sensor 14 in accordance with the thus determined shutter speed (Tv value).

Furthermore, the system control circuit 50 determines an input dynamic range of the A/D converter 16 in accordance with the determined sensitivity value (Dv value). Further, the system control circuit 50 performs a predetermined calculation by use of the image data processed in the image processing circuit 20 after the AF and AE operations. Then, the system control circuit 50 stores the AWB setting parameter for the AWB processing on the basis of the result of the calculation in the internal memory within the system control circuit 50 or in the memory 52, and terminates the AF, AE and AWB operations (Step S112).

It should be noted that the transmission of various signals between the system control circuit 50 and either the diaphragm control unit 340 or the focus control unit 342 is carried out by way of the interface 120, the connectors 122 and 322, the inter face 320 and also the lens system control circuit 350.

The system control circuit 50 checks the status of the shutter switch SW2 64 after the completion of the AF, AE and AWB operations (Step S113). When the shutter switch SW2 64 is depressed ("ON" in Step S113), the system control circuit 50 checks the motion image mode flag (Step S114). When the motion image mode flag has been reset, then the system control circuit 50 performs a still image capturing operation (Step S116), and when the motion image mode flag has been set, then the system control circuit 50 performs a motion image capturing operation (Step S117).

On the other hand, if the shutter switch SW2 64 has not been depressed ("OFF" in Step S113), the system control circuit 50 repeats the present process until the shutter switch SW1 62 is released, in other words, until the incompletely depressed state of the shutter button is released ("ON" in Step S115). When the shutter switch SW1 62 is released ("OFF" in Step S115), then the procedure returns to step S102.

When the still image capturing process (Step S116) or the motion image imaging process (Step S117) terminates, then the procedure returns to step S102, respectively. It should be noted that the motion image capturing process is described in detail referring to FIG. 3. The still image capturing process can be performed by a known still image capturing method, and since it is not related directly to the present invention, the description thereabout is omitted here.

FIG. 3 is a flowchart showing the details of the motion image capturing processing shown in FIG. 2.

In FIG. 3, the transmission of various signals between the system control circuit 50 and either the diaphragm control unit 340 or the focus control unit 342 is carried out by way of the interface 120, the connectors 122 and 322, the interface 320 and also the lens control circuit 350. First, the system control circuit 50 sets an image capturing condition for driving the diaphragm 312 to a predetermined diaphragm value by the diaphragm control unit 340 in accordance with an exposure condition and a photometric data such as the diaphragm value (Av value) and the shutter speed (Tv value) (Step S301).

Then, the system control circuit 50 carries out the setting of a CCD driving mode for driving the image sensor 14 using the timing generation circuit 18 (Step S302), and also setting of the electronic shutter (Step S303). The electronic shutter has a function of resetting the electric charges of pixels in the direction of the substrate by adding electronic shutter pulses for a predetermined period to the substrate's potential of the image sensor 14 so as to control exposure level, as described in the "Description of the Related Art" section.

Further, the system control circuit 50 performs a setting of various timing signals for each field configuring a motion image (Step S304), a setting of the cycle for each of the vertical synchronous signal VD and horizontal synchronous signal HD, and also a setting of the SSG that generates the both synchronous signals (Step S305). Further, the system control circuit 50 starts exposure and accumulation of electric charges of the image sensor 14 (Step S306).

Next, the system control circuit 50 terminates, on the completion of a field period, the exposure and accumulation of image signals (electric charges) of the image sensor 14, and reads out the image signals (electric signals) from the image sensor 14 (Step S307). Here, the system control circuit 50 writes the thus read out image signals from the image sensor 14 to a predetermined area of the memory 30 in units of image field signal as image data, either by way of the A/D converter 16, the image processing circuit 20 and the memory control circuit 22, or by way of the memory control circuit 22 directly from the A/D converter 16. It should be noted that the image signals are composed of a plurality of image field signals.

Next, the system control circuit 50 performs an image recording operation (Step S308). In other words, the system control circuit 50 reads out a part of the image data written in a predetermined area of the memory 30 by way of the memory control circuit 22. Further, the system control circuit 50 carries out a calculation of WB integration and OB (Optical Black) integration, both necessary for performing a developing process, and stores the result of the calculations in the internal memory of the system control circuit 50 or in the memory 52.

Further, the system control circuit 50 reads out the image data written into a predetermined area of the memory 30 by use of the memory control circuit 22 and, as occasion demands, the image processing circuit 20. Then, the system control circuit 50 carries out various developing process including an AWB operation, a gamma conversion processing, and also a color conversion processing, by use of a result of the calculations stored in the internal memory or the memory 52. Furthermore the system control circuit 50 reads out again the image data written into a predetermined area of the memory 30, and make the compression/expansion circuit 32 perform an image compression processing in accordance with the set mode.

Further, the system control circuit 50 writes the image data whose successive processing after the image capturing operation are finished into an empty space within an image memory buffer area of the memory 30. In connection with an execution of the successive operations, the system control circuit 50 reads out the image data stored in the image memory buffer area of the memory 30. Then, the system control circuit 50 starts writing the image data into the storage medium 200 (or the storage medium 210) by way of the interface 90 (or the interface 94), and the connector 92 (or the connector 96).

The above-noted image recording process is executed to an image data, each time when the image data whose successive processing are finished is newly written into an empty space of the image memory buffer area of the memory 30. It should be noted that during a writing operation of the image data into the storage medium 200 or 210, the notification unit 54 can, for example, blink an LED lamp and so on, to indicate a writing operation into a storage medium being executed, so as to notify the user of the fact that the writing operation is presently in progress.

Further, an image data resized to an image size suitable to the image display unit 28 is separately generated from the image data to be stored in the storage medium 200 or 210, and stored in the image display memory 24. By displaying the thus resized data on the image display unit 28 at a predetermined displaying rate, the motion image data presently being captured can be displayed.

After passing through all the above-mentioned series of operations, the system control circuit 50 checks the state of the shutter switch SW1 62 (Step S309). If the shutter switch SW1 62 has been depressed, the system control circuit 50 terminates the present operation, and the procedure returns to the flowchart of the basic operation shown in FIG. 2. On the other hand, if the shutter switch SW1 62 has not been depressed, then the procedure returns to Step S304, and the system control circuit 50 repeats the reading and recording of the imaged data in a field-by-field base from Step S304 to Step S308.

The technical feature of the present embodiment is as follows. First the horizontal cycle for driving the image sensor 14 is set to a first cycle period (Step S304), then the image sensor 14 is driven by the first cycle, to perform an image capturing operation to thereby obtain a first image field signal of the image sensor 14 (Step S307). Then, the horizontal cycle for driving the image sensor 14 during the next field period is set to a second cycle that is different from the first cycle (Step S304), then the image sensor 14 is driven by the second cycle, to perform an image capturing operation to thereby obtain a second image field signal of the image sensor 14 (Step S307).

Thereafter, a motion image is generated from the first image field signal and the second image field signal. In this case, the first image field signal and the second image field signal are processed in such a manner that they each configure at least one part of the image field signal of the motion image composed of the image signals (electric signals) that are successively read out in a field-by-field base from the image sensor 14.

Next, the characteristic operation of an image pick up apparatus according to the first embodiment is described below with reference to FIGS. 4A to 4C and FIGS. 5A to 5E.

The image pick up apparatus contains a drive mode for the image sensor 14 to configure a motion image in which the electric charges in the image sensor 14 are read out at a predetermined cycle, by the line-reducing method or line-increasing method, as with the aforementioned electronic finder display. By reading out the electric charges in the image sensor 14 by the above methods, the number of pixels can be reduced and the reading rate required for a motion image can be made faster.

Figure 8:
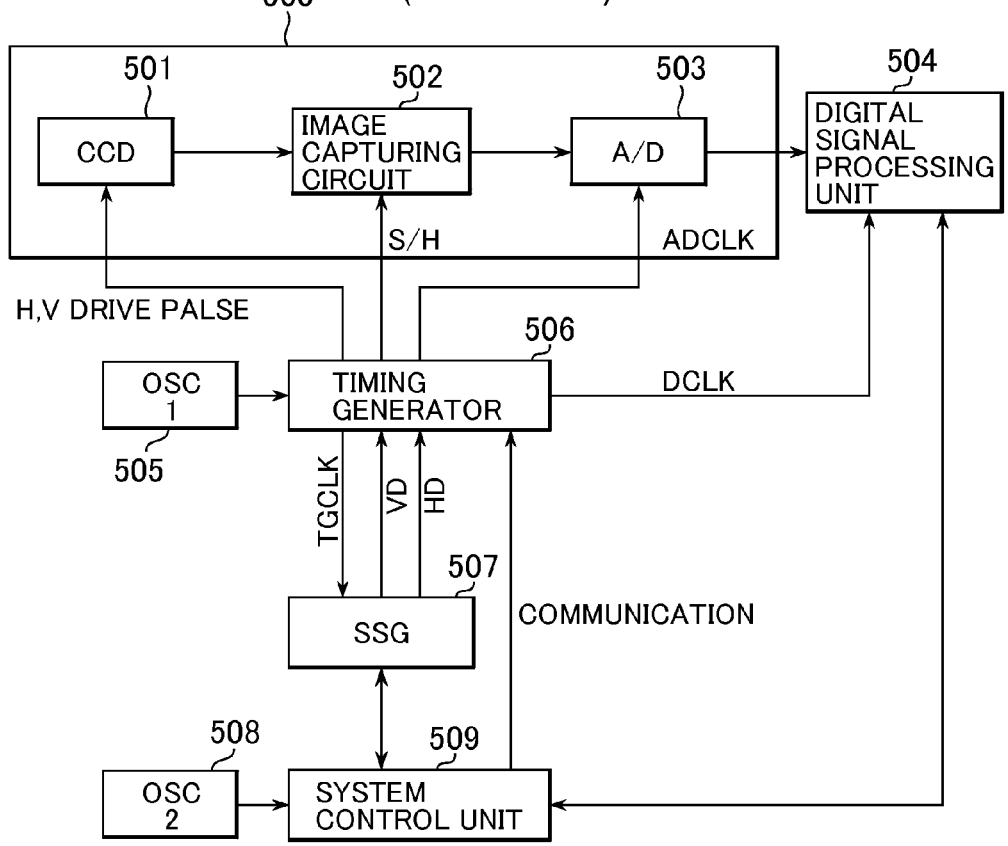
FIG. 8 is a block diagram showing a schematic configuration of an image pick up unit of a conventional image pick up apparatus.
Figure 14:
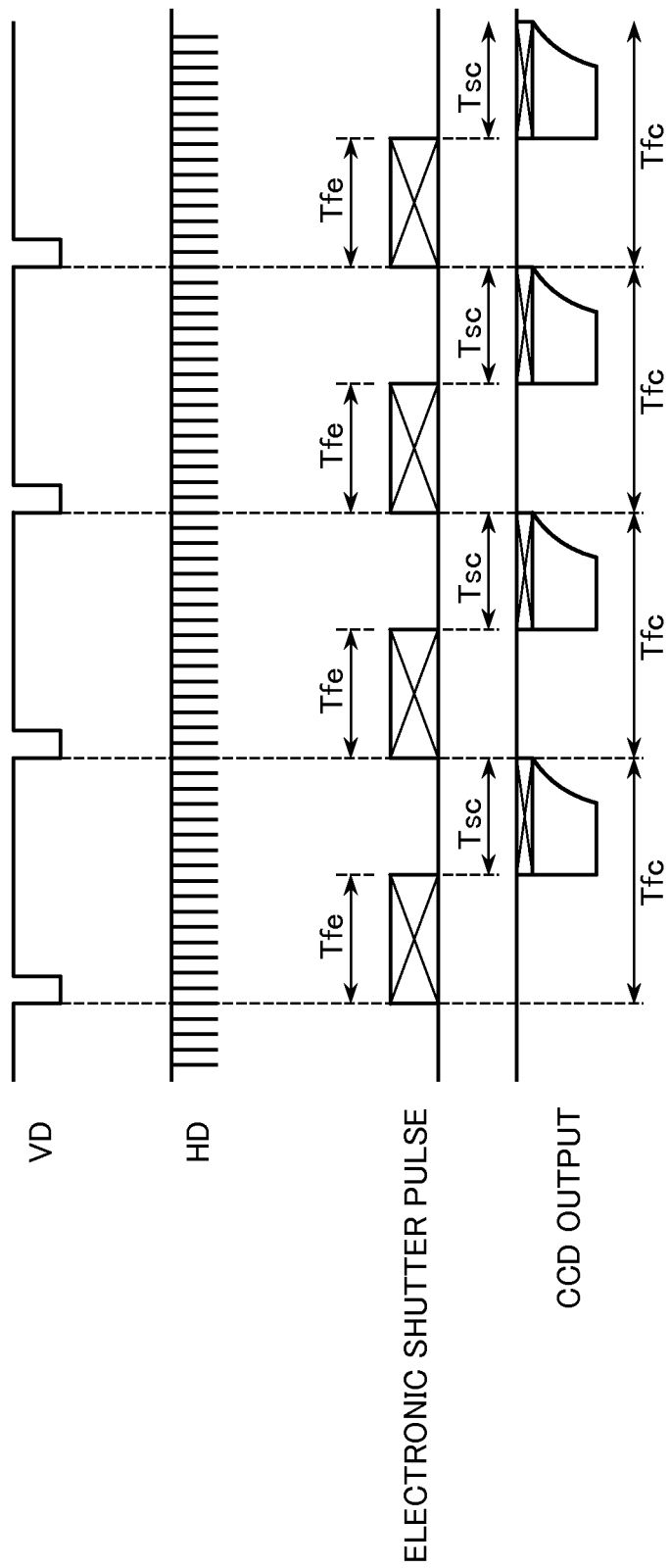
FIG. 14 is a timing chart showing the timing for capturing images when taking a motion picture.
Figure 15A:
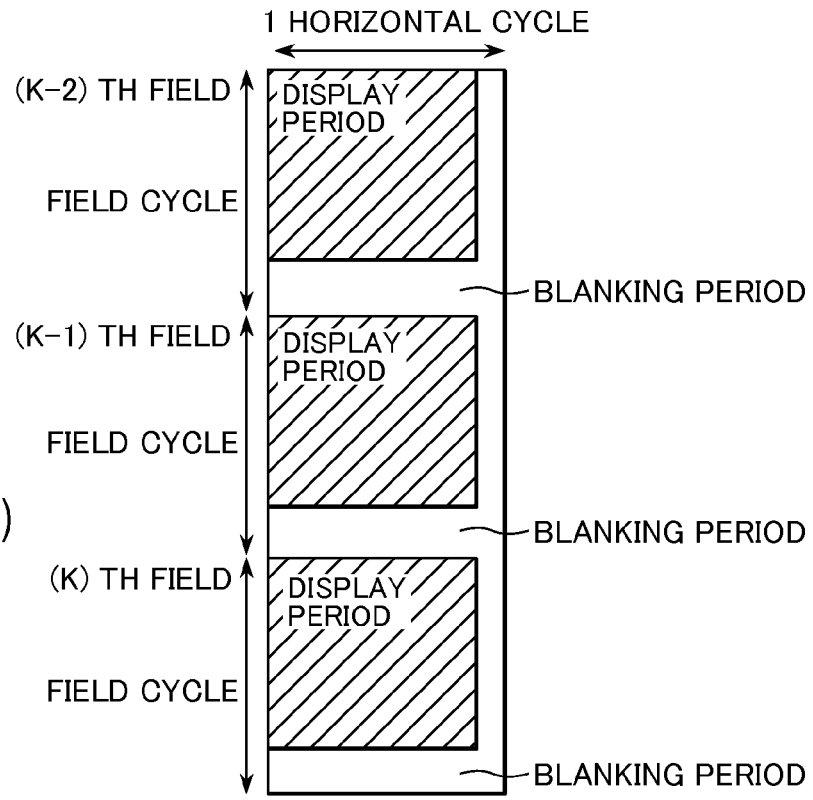
FIGS. 15A to 15C are views showing a noise pattern in a case that three fields of the noise pattern shown in FIG. 13B are combined for one frame.
Figure 15B:
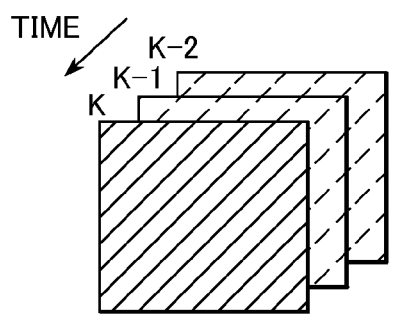
Figure 15C:
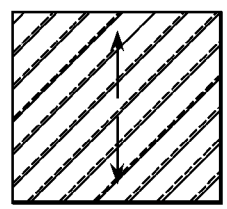

In this embodiment, the same reading method as the driving mode for a motion image described in the "Description of the Related Art" section referring to FIG. 14 is assumed. The basic configuration of the analog signal processing area including the image sensor 14 and the A/D converter 16 and of the timing generation circuit 18 are same as those described in the "Description of the Related Art" section referring to FIG. 8. The system control circuit 50 has the same function as that of the synchronous signal generation circuit 507 and the oscillation circuit 508 shown in FIG. 8. The timing generation circuit 18 has the same function as that of the synchronous signal generation circuit 505 also shown in FIG. 8. Further, each of the image processing unit 20, the memory control circuit 22 and the image display memory 24 and so on has some divided portion of the functions of the digital signal processing unit 504 shown in FIG. 8.

As mentioned heretofore, by repeating the image signal reading and recording operations in a field-by-field base shown in steps S304 to S308 of FIG. 3, a motion image composed of image signals of a plurality of fields can be generated.

In the following, as an example of an image field signal of each field configuring a motion image captured by an image pick up apparatus, a process for generating image field signals of consecutive three fields is described in detail.

First, the system control circuit 50 determines a horizontal cycle in the first field, and performs the following settings with respect to the timing generation circuit 18. It performs the setting of various timing signals for exposure, accumulation of the electric charges, and reading out image field signals in a field-by-field base in the image sensor 14 according to the horizontal cycle (Step S304). Then, it performs the setting of each cycle for a vertical synchronous signal (VD) and a horizontal synchronous signal (HD) that are to be fed to the timing generation circuit 18 from a preinstalled synchronous signal generator, and starts feeding the both signals (Step S305).

Next, the system control circuit 50 controls such that the timing generation circuit 18 is synchronized with the vertical synchronous signal (VD) and the horizontal synchronous signal (HD) to start exposure and accumulation of the electric charges with respect to the image sensor 14 (Step S306). In parallel with this, the system control circuit 50 starts reading out the image field signal in the field one before from the image sensor 14 in which exposure and accumulation of the electric charges have been executed (Step S307), and thereafter records the thus read out image field signal (Step S308).

Figure 4A:
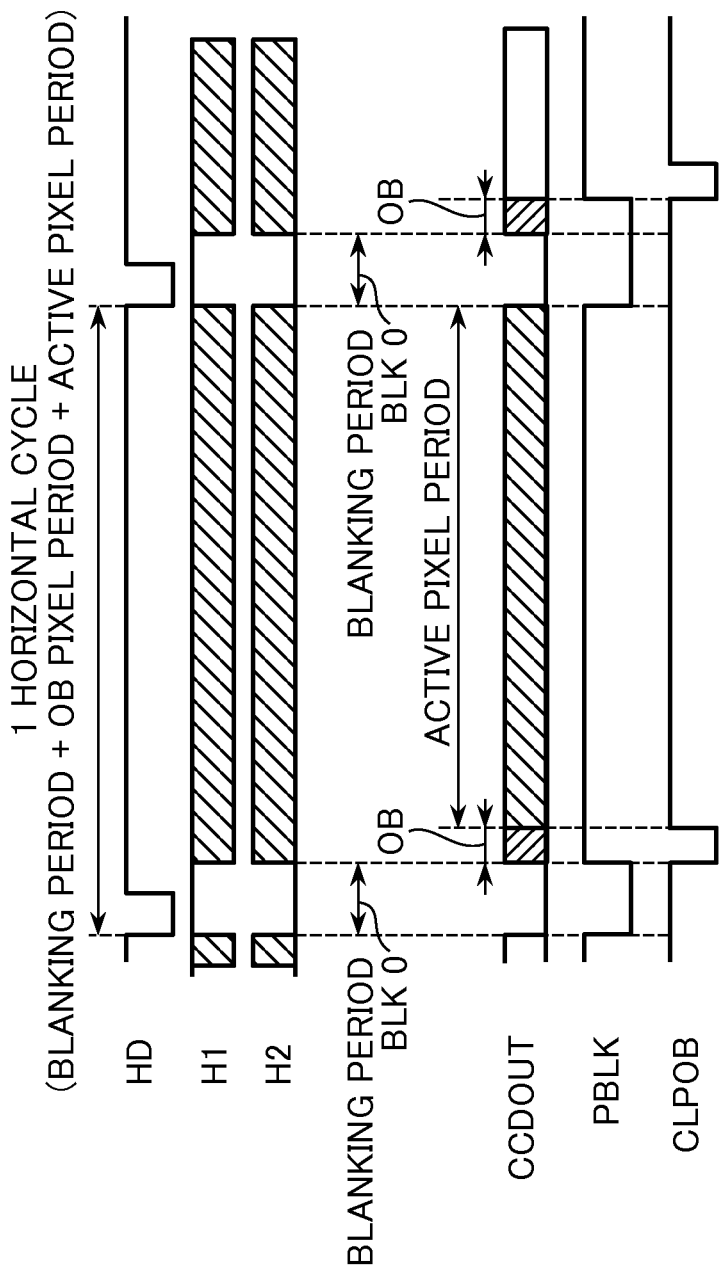
FIG. 4A is a timing chart showing the length of a horizontal blanking period in each horizontal (1H) cycle when reading an image field signal of the first field that configures a motion image captured by the image pick up apparatus according to the first embodiment of the present invention.
Figure 4C:
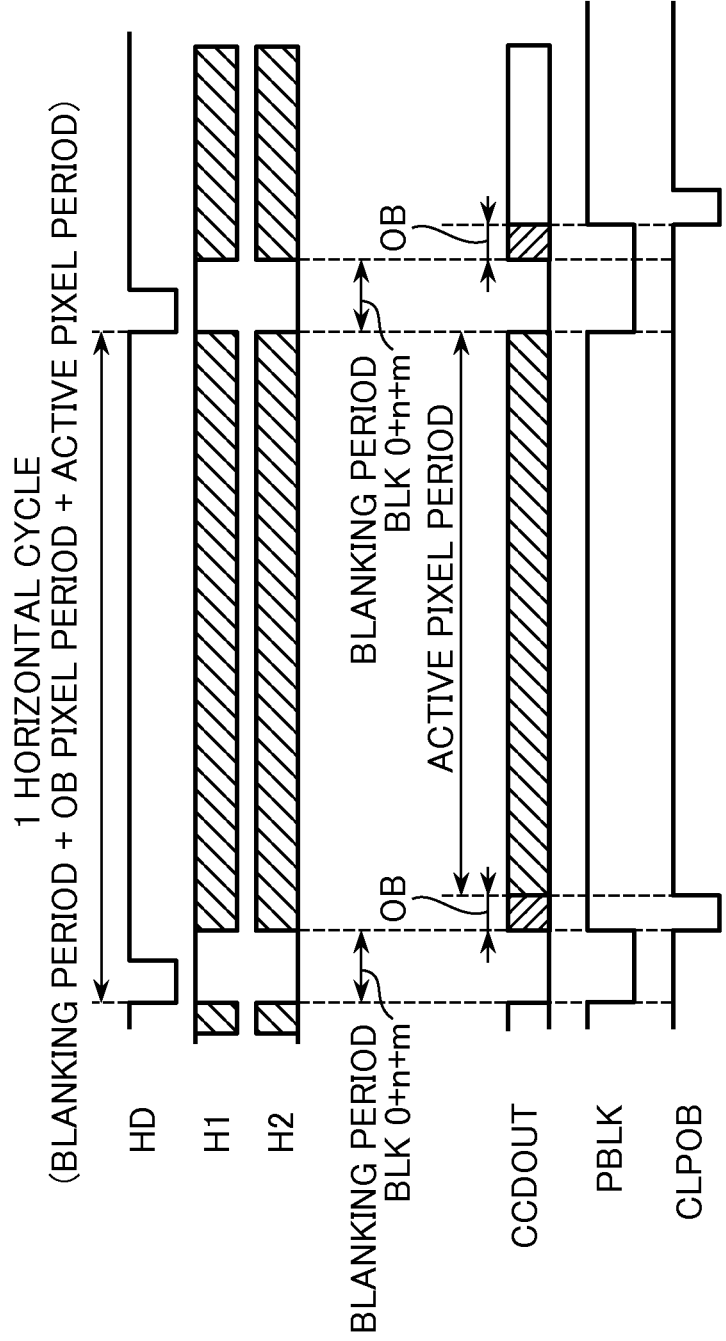
FIG. 4C is a timing chart showing the length of a horizontal blanking period in each horizontal cycle when reading an image field signal of the third field that configures the motion image.

FIG. 4A is a timing chart showing the length of a horizontal blanking period in each horizontal (1H) cycle when reading an image field signal of the first field that configures a motion image captured by an image pick up apparatus. FIG. 4B is a timing chart showing the length of a horizontal blanking period in each horizontal cycle when reading an image field signal of the second field that configures a motion image captured by the image pick up apparatus. FIG. 4C is a timing chart showing the length of a horizontal blanking period in each horizontal cycle when reading an image field signal of the third field that configures a motion image captured by the image pick up apparatus.

If the image sensor is CCD, the number of pixel clocks configuring the 1 horizontal cycle of an image signal is generally divided into a blanking period in which the driving pulses (H1, H2) for transferring the HCCD (horizontal transfer CCD) are stopped, and a pixel reading period (OB pixel period+active pixel period) in which the driving pulses are driven.

In FIGS. 4A to 4C, HD represents a horizontal synchronous signal, H1 and H2 represent drive pulses for horizontal transfer, CCDOUT represents an image signal output from the image sensor 14, PBLK represents a horizontal blanking period, and CLPOB represents a clamp pulse.

In this embodiment, when the length of periods other than the active pixel period within each horizontal cycle for driving the image sensor 14 is made different from one another by a control of the system control circuit 50, the horizontal cycle of each field can be made different. In other words, by making the length of a horizontal blanking period (blanking period in each horizontal period within a horizontal cycle) different in each field period, a horizontal cycle can be made different for each field without affecting the pixel reading period.

As shown in FIG. 4A, the number of pixel clocks in the blanking period when reading an image field signal of the first field configuring a motion image from the image sensor 14 is set to "BLK0".

As shown in FIG. 4B, the number of pixel clocks in the blanking period when reading an image field signal of the second field from the image sensor 14 is changed to "BLK0+n" by adding "just n clocks" to "BLK0". Due to this, the cycle of a horizontal line at the time of reading an image signal of the next second field can be made longer than that at the time of reading an image signal of the first field.

As shown in FIG. 4C, the number of pixel clocks in the blanking period when reading an image field signal of the third field from the image sensor 14 is changed to "BLK0+n+m" by adding moreover "just m clocks" to "BLK0+n", wherein either condition of n=m or n≠m can be selected. Due to this, the cycle of the horizontal blanking period at the time of reading an image field signal of the third field can be made different from those at the time of reading the image field signal of the first field and the second field.

As a specific operation, the system control circuit 50 performs the following settings in the step S304 shown in FIG. 3. When reading out the first field, it controls the timing generation circuit 18 such that the active period of the horizontal blanking is set to "BLK0". When reading out the second field, it controls the timing generation circuit 18 such that the active period of the horizontal blanking is set to "BLK0+n". When reading out the third field, it controls the timing generation circuit 18 such that the active period of the horizontal blanking is set to "BLK0+n+m".

The timing generation circuit 18 receives the information about an active period of horizontal blanking set by the system control circuit 50, and sets the period during the PBLK is LOW as the horizontal blanking period. Then the timing generation circuit 18 has a function of starting to feed all the horizontal-base timing signals with respect to the analog signal processing area including the image sensor 14 and the A/D converter 16 at the timing of the ending of each horizontal blanking period.

For example, in a case of the clamp pulse (CLPOB), as can be understood by FIGS. 4A to 4C, taking the beginning of each horizontal period as a base, the timing at which the clamp pulse (CLPOB) is output varies in connection with an expansion of the "PBLK" (horizontal blanking period). It should be noted that the clamp pulse is a pulse that indicates an OB pixel period for adjusting the level of the direct voltage level in such a manner that the level of the OB pixel becomes a black reference value of an image signal.

Next, by changing the horizontal cycle of each field using the horizontal blanking period, how a motion image composed of field images formed by three read-out fields looks when a noise is included is described.

In the "description of the Related Art" section, the fact that visual impression of an equal-pitch noise that is one-dimensionally superimposed on an image signal varies depending on the number of pixels composing one horizontal cycle, with respect to a two-dimensional image expanded in the horizontal and vertical directions in the CCD area sensor is already described. As shown in FIGS. 13A to 13E, for example in the case of an equal-pitch noise of 5-pixel cycle, the noise pattern formed during that period contains 5 variations that is based on a coset of 5 in accordance with the number of pixels composing one horizontal cycle. As can be observed from FIGS. 13A to 13E, although there is no change in noise pitches in the horizontal direction in each pattern, since the angle of the noise pattern varies on an expanded two-dimensional image, the level of its noticeability varies.

On the other hand, in this embodiment, the fact that the above-noted angle of a noise pattern varies in accordance with a coset of the noise pitch is utilized. That is, by changing the horizontal cycle of each field with respect to a periodic equal-pitch noise superimposed on each field image configuring a motion image, the angle of the noise pattern on the expanded two-dimensional image is controlled. Since the horizontal cycle is changed by adjusting the length of a horizontal blanking period in this method as described above, it can cause no effect to a image of the target to be captured.

FIGS. 5A to 5E are views each showing an example of a noise pattern of 5-pixel cycle superimposed on each field in a case in which successive three fields, namely the $(J-2)_{th}$, the $(J-1)_{th}$ and the $J_{th}$ fields are read out from a plurality of field images that configure a motion image.

Figure 5A:
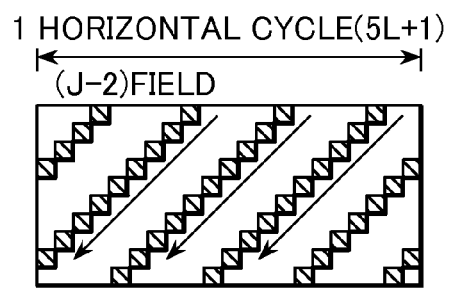
FIGS. 5A to 5E are views each showing an example of a noise pattern of 5-pixel cycle superimposed on each field in a case in which successive three fields, namely the $(J-2)_{th}$, the $(J-1)_{th}$ and the $J_{th}$ fields are read out from a plurality of field images that configure the motion image.
Figure 5B:
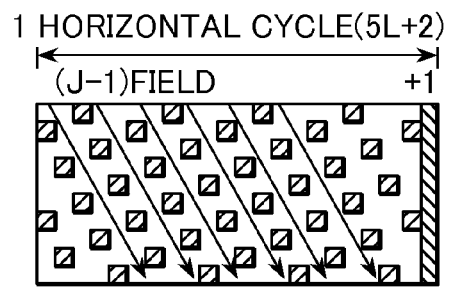
Figure 5C:
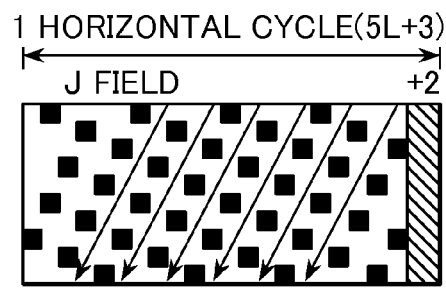
Figure 5D:
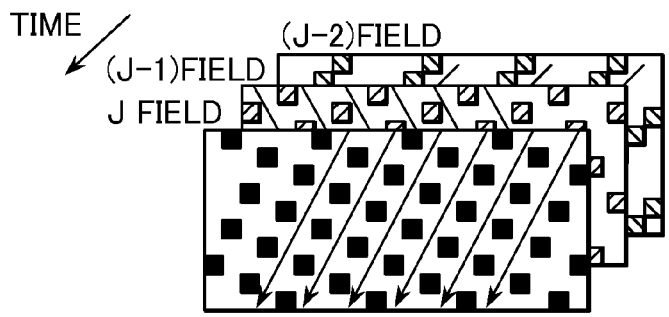
Figure 5E:
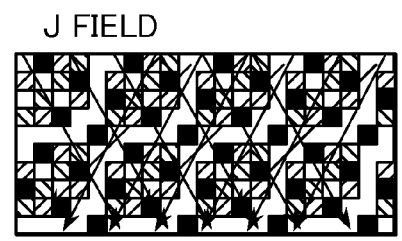

FIG. 5A shows a noise pattern in a case in which the horizontal cycle of the $(J-2)_{th}$ field is (5L+1). FIG. 5B shows a noise pattern in a case in which the horizontal cycle of the $(J-1)_{th}$ field is (5L+2). FIG. 5C shows a noise pattern in a case in which the horizontal cycle of the $J_{th}$ field is (5L+3). Each of FIGS. 5D and 5E shows an example of a noise pattern which is sighted due to the responsibility of the image display unit 28 and an afterimage effect in a case in which a motion image is composed of field images made up by these three fields.

As can be seen from FIGS. 5A to 5E, by changing the horizontal blanking period for one pixel clock, the angle of a noise pattern between each field is greatly changed. Due to this fact, on a motion image composed of these field images, a periodic feature of a noise pattern contained in each of the field images is countervailed, resulting in an image whose noise pattern is made less noticeable.

If there is no relationship (free-run) between the pixel clock frequency and the system clock frequency that can be a cause of the equal-pitch noise, as the management of mutual phase relation can not be performed, a phase discrepancy is readily caused due to a frequency deviation and a temperature drift. However, when contrasted with the amount of phase-shift by the frequency deviation and the temperature drift, since the noise pattern changes between the field images in accordance with a change of the horizontal cycle, the noise pattern between the field images obtains a correlative relation, and due to this its feature is not intensified.

As described heretofore, according to the present embodiment, a horizontal cycle of each field can be made different from one another by changing the length of the horizontal blanking period when reading out the image signal of each field configuring a motion image. By this operation, without any harmful effect to a motion image to be displayed on the image display unit 28, a noise can be made less noticeable by corrupting the periodicity of a noise. In other words, a noise that has a periodicity in a captured motion image becomes quite inconspicuous without making the structure of the image pick up apparatus complicated.

Second Embodiment

A second embodiment of the present invention differs from the first embodiment in the points described below. Description of other factors of the present embodiment is omitted here, as they are same as those corresponding to the first embodiment shown in FIG. 1.

In the first embodiment, a method by which a horizontal cycle can be made different without affecting a pixel reading period by adjusting the length of a horizontal blanking period for each field period is used. However, in this method above, it is required to change a drive start timing for all the horizontal-base timing signals fed to the analog signal processing area including the CCD element in the image sensor 14 and the A/D converter 16 in connection with the change of the timing of ending the horizontal blanking period. For this reason, the timing generation circuit 18 is provided with a timing changing function, but there is a case that the timing generation circuit 18 is not provided with this function.

If the timing generation circuit 18 is programmable to be able to change the timing generation of all the concerned horizontal-base timing signals, it is not impossible to change the timing all at once at a vertical blanking period just before reading out each field. However, the performance of the system control circuit 50 as a whole is made lower accordingly. In addition, if there is any timing signal whose timing is fixed and cannot be changed, or whose change of a timing is not immediately applicable even though the setting of the timing is changeable, then it is not possible to change a horizontal cycle at the vertical blanking period between the fields by the method above.

In this second embodiment, however, changing the horizontal cycle of each field is realized by a different method from that noted above. In the case of a CCD image sensor, 1 horizontal cycle is generally divided into two periods: namely a blanking period in which the driving pulses (H1, H2) for transferring the HCCD (horizontal transfer CCD) are inactive, and a pixel reading period (OB pixel period+active pixel period) in which the driving pulses are being driven (refer to FIG. 9).

In this embodiment, the horizontal cycle of each field can be made different by making an empty transfer period within the horizontal cycle for driving the image sensor 14 different from one another. In other words, by adding an empty transfer period of HCCD at the end of the pixel reading period (OB pixel period+active pixel period) without changing the blanking period, the horizontal cycle can be made different for each field. The empty transfer means an empty reading state in which a signal without any accumulated electric charges therein is outputted when, after all the electric charges accumulated in the photoelectric conversion elements in the active pixel area are read out by way of the HCCD, the drive pulses (H1 and H2) for signal transfer are further sent to the HCCD continuously.

Figure 6B:
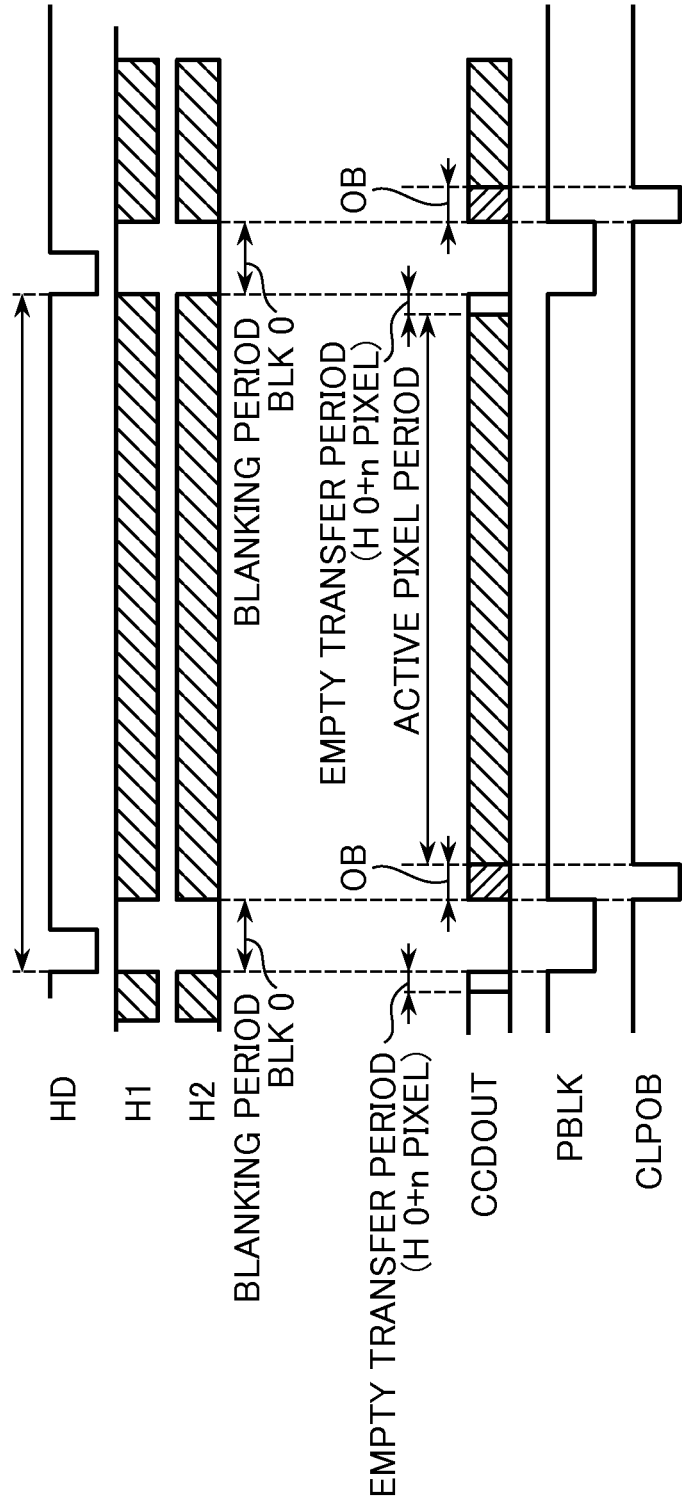
FIG. 6B is a timing chart showing the length of an empty transfer period in each horizontal cycle when reading an image field signal of the second field that configures the motion image.

FIG. 6A is a timing chart showing the length of an empty transfer period in each horizontal (1H) cycle when reading an image field signal of the first field that configures a motion image captured by an image pick up apparatus according to a second embodiment of the present invention. FIG. 6B is a timing chart showing the length of an empty transfer period in each horizontal cycle when reading an image field signal of the second field that configures a motion image captured by the image pick up apparatus. FIG. 6C is a timing chart showing the length of an empty transfer period in each horizontal cycle when reading an image field signal of the third field that configures a motion image captured by the image pick up apparatus.

As shown in FIG. 6A, at the time of reading out an imaging field signal of the first field configuring a motion image from the image sensor 14, the number of pixel clock in an empty transfer period superfluously provided at the end of the active pixel period of the image field signal is set to "HO".

As shown in FIG. 6B, at the time of reading out an imaging field signal of the second field configuring the motion image from the image sensor 14, the number of pixel clock in the empty transfer period superfluously provided at the end of the active pixel period of the image field signal is changed to "HO+n" by adding n clocks to the "HO" period.

As shown in FIG. 6C, at the time of reading out an imaging field signal of the third field configuring the motion image from the image sensor 14, the number of pixel clock in the empty transfer period superfluously provided at the end of the active pixel period of the image field signal is changed to "HO+n+m" by adding "m" clocks to the "HO+n" period, wherein either "n=m" or "n≠m" is possible.

Due to these operations, the empty transfer period at the time of reading out an imaging field signal of the third field can be made different from the empty transfer period at the time of reading out an image field signal of the first field and also from the empty transfer period at the time of reading out an image field signal of the second field.

As a specific operation, the system control circuit 50 performs the following setting in the step S304 of FIG. 3. First, when reading out the first field, the system control circuit 50 sets the timing generation circuit 18 in such a manner that the drive pulses H1 and H2 for a horizontal transfer corresponding to the horizontal synchronous signal HD are continued until the input time of the next HD signal. Then, the system control circuit 50 resets the drive starting timing of all the horizontal-base timing signals fed to the analog signal processing area including the CCD element within the image sensor 14 and the A/D converter 16 at the input timing of the next HD signal.

Due to these processing, in this embodiment, changing the timing of the clamp pulse (CLPOB) indicating the OB pixel period or the like for each field such as the one shown in the first embodiment is no longer needed.

Further, since the empty transfer period is an adjusting period after the completion of the active pixel period of HCCD, but not during the active pixel period, the residual charges of the HCCD not being transferred have hardly effect on the reading out the next electric charge signal. Thus, the empty transfer period will not cause any harm to the proper image to be displayed on the image display unit 28.

As described heretofore, according to this second embodiment, a horizontal cycle of each field can be made different from one another by carrying out an empty transfer after the active pixel period, and changing the empty transfer period of each field configuring a motion image. By this operation, a proper image to be displayed on the image display unit 28 is not affected, yet a noise can be made less noticeable by corrupting the periodicity of the noise. In other words, a noise that has a periodicity in a captured motion image can be made quite inconspicuous without making the structure of the image pick up apparatus complicated.

Third Embodiment

A third embodiment of the present invention differs from the first embodiment in the points described below. Description of other factors of the present embodiment is omitted here, as they are same as those corresponding to the first embodiment shown in FIG. 1.

In the first and second embodiments, if the horizontal cycle of each field configuring a motion image is made different, the vertical cycle also varies in accordance with the varied amount of the horizontal cycle. For example, if one field is composed of 100 horizontal lines, and if a horizontal cycle is increased for one pixel cycle for each field, then 100 pixel cycles are increased in the whole one field, so that the resulted vertical cycle is made longer for 100 pixel cycles.

In the "Description of the Related Art" section, the timing for an image capturing operation when taking a motion image according to a conventional configuration is described referring to FIG. 14. In FIG. 14, the exposure time Tsc of an image field signal in one field is obtained by subtracting an electronic shutter pulse application period Tfe from a vertical cycle Tfc that is one field period. In other words, in a case in which an electronic shutter pulse application period Tfe is same for each field and the vertical cycle Tfc is different for each field, the exposure time Tsc in the image field signal of each field also varies in connection with the vertical cycle Tfc.

A variation of the exposure time Tsc in an image field signal of each field causes a variation of the image field signal level, and if the varied amount of the exposure time Tsc is large, it becomes a cause of a so-called field flicker, and thus a correction of the exposure time Tsc is required. If the varied amount of the exposure time Tcs is large, a timing control mechanism such as precisely adjusting the electronic shutter pulse application period Tfe in units of one pixel cycle is required. In such a case, the scale of the timing circuit is made large as a whole and the exposure control is made complicated. These will increase undesirable power consumption.

It should be noted that a noise included in an image signal is noticeable when the sensitivity (Dv value) of an image pick up apparatus is high, that is, when the gain of the image capturing circuit is high. Further, the changing rate of the above-noted field flicker becomes larger as the electronic shutter speed (Tv value) that determines an amount of the exposure with respect to the variation of the vertical cycle becomes shorter, it follows that the field flicker becomes more noticeable.

Figure 7:
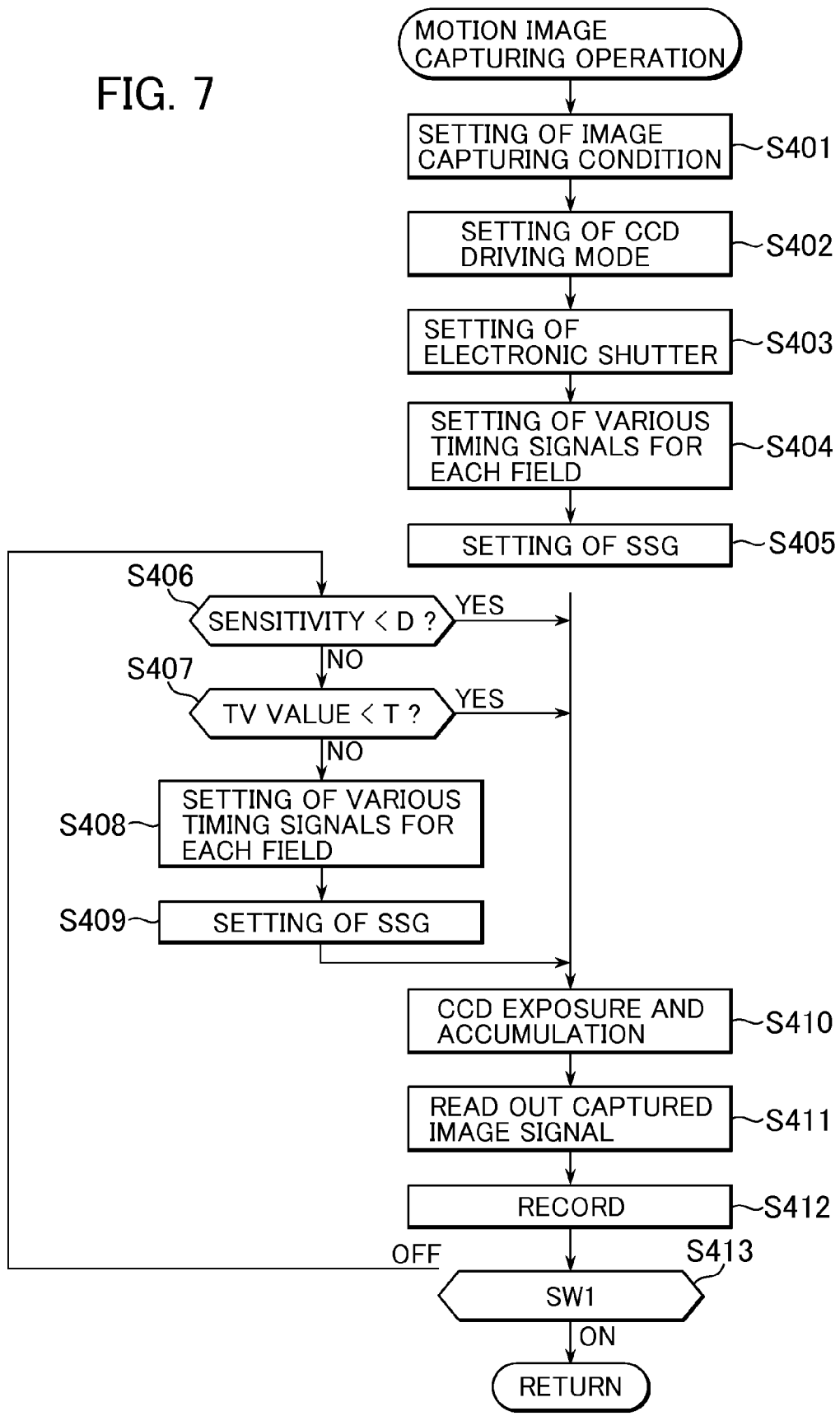
FIG. 7 is a flowchart showing a process for processing a motion image performed by an image pick up apparatus according to a third embodiment of the present invention.

In this third embodiment, considering all this above, a motion image processing shown in FIG. 7 is performed in which a specific processing for suppressing the field flicker and yet for making the noise less noticeable is incorporated to the processing shown in FIG. 3.

FIG. 7 is a flowchart showing a process for processing a motion image performed by an image pick up apparatus.

Description of the process common to FIG. 3 and FIG. 7 is simplified here. First, the system control circuit 50 drives the diaphragm 312, on the basis of an exposure condition and photometric data such as a diaphragm value (Av value) and a shutter speed (Tv value) stored in the internal memory or the memory 52 (Step S401). Thereafter, the system control circuit 50 also sets the CCD drive mode (Step S402) and the electronic shutter (Step S403) using the timing generation circuit 18.

Further, the system control circuit 50 performs a setting of various timing signals for each field (Step S404), and also performs a setting of the SSG that sets each cycle of the both vertical synchronous signals (VD) and horizontal synchronous signals (HD) and generates both of them (Step S405). Further, the system control circuit 50 starts exposure and accumulation of electric charges of the image sensor 14 (Step S410). Further, the system control circuit 50 terminates, on the completion of a field period, the exposure and accumulation of electric charges of the mage sensor 14, and reads out the image signals from the image sensor 14 (Step S411), and stores as an image data in a storage medium (Step S412).

When the system control circuit 50 has gone through all the processing above, the system control circuit 50 checks the state of the shutter switch SW1 62 (Step S413). If the shutter switch SW1 62 has been depressed, then the system control circuit 50 terminates this operation and the procedure returns to the flowchart of a basic operation of the image pick up apparatus shown in FIG. 2. On the other hand, if the shutter switch SW1 62 has not been depressed, the system control circuit 50 compares the sensitivity value (Dv value) already set by the AE operation with a predetermined value D (Step S406).

If the sensitivity value (Dv value) is smaller than the predetermined value D, the system control circuit 50 proceeds with the process of the next field without updating the horizontal cycle. In other words, if the sensitivity value (Dv value) set for each field is smaller than the predetermined value D, the control circuit 50 does not execute the control by which the horizontal cycle of each field is made different. In other word, it does not update the horizontal cycle set at the setting stage of various timing signals executed for each field. Thereafter, the system control circuit 50 reads out an image signal of each field by repeatedly executing the steps from S410 to S412 and records until the shutter SW1 62 is depressed ("ON" in step S413).

On the other hand, if the sensitivity value (Dv value) is equal to or greater than the predetermined value D, the system control circuit 50 compares the electronic shutter speed (Tv value) with a predetermined value T (Step S407). If the electronic shutter speed (Tv value) is smaller than the predetermined value T, the system control circuit 50 proceeds with the process of the next field without updating the horizontal cycle. In other words, if the exposure period of the image signal set for each field is smaller than the predetermined value, then, the control circuit 50 does not execute the control by which the horizontal cycle of each field is made different. In other word, it does not update the horizontal cycle set at the setting stage of various timing signals executed for each field. Thereafter, the system control circuit 50 reads out the image signal of each field by repeatedly executing the steps from S410 to S412 and records until the shutter SW1 62 is depressed ("ON" in the step S413).

On the other hand, If the electronic shutter speed (Tv value) is equal to or greater than a predetermined value T, the system control circuit 50 sets the various timing signals for each field at the updated horizontal cycle and vertical cycle (Step S408), and also performs the setting of the SSG that sets each cycle of the both vertical synchronous signals (VD) and horizontal synchronous signals (HD) and generates both of them (Step S409). Further, the system control circuit 50 executes the following step, that is, with updating the horizontal cycle and the vertical cycle for each field, the system control circuit 50 reads out an image signal of each field by repeatedly executing the steps from S410 to S412 and records until the shutter SW1 62 is depressed ("ON" in step S413).

Since the method of updating the horizontal cycle for each field is same as that described in the first and second embodiments, the detailed explanation thereabout is omitted here.

The above-noted predetermined value D is a value that is suitably selected sensitivity (Dv value) at the borderline where the periodic noise superimposed on an imaging signal becomes noticeable, and the predetermined value T is a value that is suitably selected shutter speed (Tv value) at the borderline where the field flicker becomes noticeable by changing the horizontal field for each field.

As described heretofore, according to this third embodiment, a noise can be made less noticeable without generating the field flicker and corrupting the periodicity of the noise, except the comparatively rare condition in which both of the sensitivity and the shutter speed are quite high. In other words, a noise that has a periodicity in a captured motion image can be made inconspicuous without making the structure of the image pick up apparatus complicated.

Other Embodiments

In the first and second embodiments, the processing at the time of reading out three consecutive fields configuring a motion image is described. A long-time motion image can be recorded maintaining an effect of making a noise less noticeable by repeating the same process as the method of reading out three fields. In this case, the number of fields for making the horizontal cycles different is not limited to three fields, but can be any number as long as it is plural.

Further, in the first and second embodiments, the processing at the time of capturing a motion image and recording the captured motion image is described. However, in accordance with the subject of the present invention for making a periodic noise superimposed on an image of each field less noticeable by making the horizontal cycle of each field different, the present invention can be also useful to the display of a motion image in the electronic finder.

Further in the aforementioned embodiments from the first to the third, a digital single-lens reflex camera of a lens-exchangeable type was taken as an example of the image pick up apparatus, but it is not limited to this. The present invention can be applied to any of digital video camera, a digital compact camera in which a camera main body, a lens and a mirror tube are integrated, a mobile terminal with an image capturing function (including a mobile telephone having a camera) and also a scanner (image reading apparatus). In fact, the present invention can be applied to any apparatus, on condition that it can convert an optical image of a target object into an electric image signal to be output, and is equipped with a motion image capturing function.

It is to be understood that the objective of the present invention may be also accomplished by supplying a system or an apparatus with a storage medium in which a program code of a software that realizes the functions of the above described embodiments is stored, and causing a computer (or CPU or MPU) of the system or apparatus to read out and execute the program code stored in the storage medium.

In this case, the program code itself read from the storage medium realizes the functions of any of the embodiments described above, and the program code and a storage medium in which the program code is stored configure the present invention.

Examples of the storage medium for supplying the program code include a floppy (registered trademark) disk, a hard disk, an magnetic optical disk, a CD-ROM, a CD-R, a CD-RW, a DVD-RAM, a DVD-RW, a DVD+RW, a magnetic tape, a non-volatile memory card, a ROM and so on. Alternatively, the program code can be downloaded via a network.

Further, the case in which the functions of the embodiments described above are realized by executing the program code read out by a computer is also included in the present invention. In addition, the case in which an OS (Operation System) running on a computer executes a part or all of the actual processing based on the instructions in the program code, and the functions of the embodiments described above is realized by this operation is also included in the present invention.

Still further, the case in which the functions of the embodiments described above are realized by executing the following processing is also included in the present invention. That is, the program code read out from a storage medium is written into a memory device provided on a function expansion board inserted into a computer or in a function expansion unit connected to the computer, and thereafter, a CPU or the like provided in the function expansion board or the function expansion unit executes a part or all of the processing based on the instructions in the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-000595, filed Jan. 7, 2008, which is hereby incorporated by reference herein its entirety.

What is claimed is:

1. An image processing apparatus comprising:
an image pick up unit configured to convert an optical image of a target object to image signals;
a control unit configured to drive said image pick up unit so as to read out the image signals consecutively from said image pick up unit in a field-by-field base;
a signal processing unit configured to generate an image from the image signals consecutively read out from said image pickup unit in a field-by-field base; and
a setting unit configured to set an image pick up condition of said image pick up unit in a field-by-field base,
wherein said control unit executes a control to change a horizontal cycle, at which said image pick up unit is driven, in the field-by-field base, when the image pick up condition set by said setting unit does not satisfy a predetermined condition, and does not execute the control to change the horizontal cycle, at which said image pick up unit is driven, in the field-by-field base, when the image pick up condition set by said setting unit satisfies the predetermined condition.

2. The image processing apparatus according to claim 1, wherein said control unit sets the horizontal cycle of the each field different by making the length of the period other than an active pixel period within each horizontal period of the horizontal cycle different.

3. The image processing apparatus according to claim 2, wherein said control unit sets the horizontal cycle of the each field different by making the length of a blanking period during which the transfer of the electric charges in the horizontal direction in said image pick up unit is stopped within each horizontal period of the horizontal cycle different.

4. The image processing apparatus according to claim 2, wherein said control unit sets the horizontal cycle of the each field different by making the length of an empty transfer period during which a signal that has no accumulated electric charges in said image pick up unit is output within each horizontal period of said horizontal cycle different.

5. The image processing apparatus according to claim 1, wherein the image pick up condition comprises an image pick up sensitivity, and said control unit does not execute the control to change the horizontal cycle, at which said image pick up unit is driven, in the field-by-field base when the sensitivity value set by said setting unit is smaller than a predetermined value of the image pick up sensitivity.

6. The image processing apparatus according to claim 1, wherein the image pick up condition comprises an exposure time of the image signal read out in said image pick up unit, and said control unit does not execute the control to change the horizontal cycle, at which said image pick up unit is driven, in the field-by-field base when the exposure time set by said setting unit is smaller than a predetermined value of the exposure time of the image signals.

7. The image processing apparatus according to claim 1, which is applicable to any one of an image pick up apparatus, a mobile telephone with an image capturing function, or an image reading apparatus.

8. A method of controlling an image pick up apparatus comprising an image pick up unit that converts an optical image of a target object to image signals, the method comprising the steps of:
driving the image pick up unit so as to read out the image signals consecutively from the image pick up unit in a field-by-field base;
generating an image from the image signals consecutively read out from the image pickup unit in a field-by-field base;
setting an image pick up condition of the image pick up unit in a field-by-field base;
changing a horizontal cycle, at which the image pick up unit is driven, in the field-by-field base, when the image pick up condition set in the setting step does not satisfy a predetermined condition; and
not changing the horizontal cycle, at which the image pick up unit is driven, in the field-by-field base, when the image pick up condition set in the setting step satisfies the predetermined condition.

9. A non-transitory computer-readable storage medium that stores a program for causing a computer to execute a method of controlling an image pick up apparatus provided with an image pick up unit that converts an optical image of a target object to image signals, the method comprising the steps of:
driving the image pick up unit so as to read out the image signals consecutively from the image pick up unit in a field-by-field base;
generating an image from the image signals consecutively read out from the image pickup unit in a field-by-field base;
setting an image pick up condition of the image pick up unit in a field-by-field base;
changing a horizontal cycle, at which the image pick up unit is driven, in the field-by-field base, when the image pick up condition set in the setting step does not satisfy a predetermined condition; and
not changing the horizontal cycle, at which the image pick up unit is driven, in the field-by-field base, when the image pick up condition set in the setting step satisfies the predetermined condition.

10. An image processing apparatus comprising:
an image pick up unit configured to convert an optical image of a target object to image signals;
a control unit configured to drive said image pick up unit so as to read out the image signals from said image pick up unit;
a signal processing unit configured to generate an image from the image signals read out from said image pickup unit; and
a setting unit configured to set an image pick up condition of said image pick up unit,
wherein said control unit changes a horizontal cycle by changing a length of a blanking period within the each horizontal period of the horizontal cycle in accordance with the image pick up condition set by said setting unit, so that periodic noises superimposed on the image signal becomes unnoticeable.

11. The image processing apparatus according to claim 10, wherein the image pick up condition comprises an image pick up sensitivity, and said control unit does not change the horizontal cycle when a sensitivity value set by said setting unit is smaller than a predetermined value of the image pick up sensitivity.

12. The image processing apparatus according to claim 10, wherein the image pick up condition comprises an exposure time of the image signal read out in said image pick up unit, and said control unit does not change the horizontal cycle when the exposure time set by said setting unit is smaller than a predetermined value of the exposure time of the image signals.

13. The image processing apparatus according to claim 10, wherein the image processing apparatus is one of an image pick up apparatus, a mobile telephone with an image capturing function, or an image reading apparatus.

14. A method of controlling an image pick up apparatus comprising an image pick up unit that convert an optical image of a target object to image signals, the method comprising the steps of:
- driving the image pick up unit so as to read out the image signals from the image pick up unit;
- generating an image from the image signals read out from the image pickup unit;
- setting an image pick up condition of the image pick up unit; and
- changing a horizontal cycle by changing a length of a blanking period within the each horizontal period of the horizontal cycle in accordance with the image pick up condition set in the setting step, so that periodic noises superimposed on the image signal becomes unnoticeable.

15. A non-transitory computer-readable storage medium that stores a program for causing a computer to execute a method of controlling an image pick up apparatus provided with an image pick up unit that converts an optical image of a target object to image signals, the method comprising the steps of:
- driving the image pick up unit so as to read out the image signals from the image pick up unit;
- generating an image from the image signals read out from the image pickup unit;
- setting an image pick up condition of the image pick up unit; and
- changing a horizontal cycle by changing a length of a blanking period within the each horizontal period of the horizontal cycle in accordance with the image pick up condition set in the setting step, so that periodic noises superimposed on the image signal becomes unnoticeable.

* * * * *